US009882480B2

(12) United States Patent
Lee et al.

(10) Patent No.: US 9,882,480 B2
(45) Date of Patent: Jan. 30, 2018

(54) VOLTAGE CONVERTER FOR CONTROLLING A VOLTAGE OF A FLYING CAPACITOR AND A VOLTAGE CONTROL METHOD THEREOF

(71) Applicant: SAMSUNG ELECTRONICS CO., LTD., Suwon-si, Gyeonggi-Do (KR)

(72) Inventors: Sungwoo Lee, Suwon-si (KR); Minkyu Kwon, Hwaseong-si (KR); Hocheol Chung, Suwon-si (KR); Sungkyu Cho, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 36 days.

(21) Appl. No.: 15/139,715

(22) Filed: Apr. 27, 2016

(65) Prior Publication Data

US 2016/0329810 A1    Nov. 10, 2016

(30) Foreign Application Priority Data

May 6, 2015    (KR) .......................... 10-2015-0063251

(51) Int. Cl.
*H02M 3/158*    (2006.01)
*H02M 3/07*    (2006.01)

(52) U.S. Cl.
CPC .............. *H02M 3/158* (2013.01); *H02M 3/07* (2013.01)

(58) Field of Classification Search
CPC .......... H02M 1/08; H02M 1/088; H02M 3/07; H02M 3/156; H02M 3/158; H02M 2001/0003; H02M 2003/156; H02M 2003/158
See application file for complete search history.

(56) References Cited

U.S. PATENT DOCUMENTS

| | | |
|---|---|---|
| 5,532,575 A | 7/1996 | Ainsworth et al. |
| 6,058,031 A | 5/2000 | Lyons et al. |
| 6,349,044 B1 | 2/2002 | Canales-Abarca et al. |
| 6,795,323 B2 | 9/2004 | Tanaka et al. |
| 7,061,777 B2 | 6/2006 | Zeng et al. |
| 7,219,673 B2 | 5/2007 | Lemak |

(Continued)

FOREIGN PATENT DOCUMENTS

| | | |
|---|---|---|
| KR | 10-0874809 | 12/2008 |
| KR | 1020120071318 | 7/2012 |

OTHER PUBLICATIONS

H. Ertl, et al., "Active Voltage Balancing of DC-Link Electrolytic Capacitors", IET Power Electron, 2008, vol. 1, No. 4, pp. 488-496.

(Continued)

*Primary Examiner* — Matthew Nguyen
(74) *Attorney, Agent, or Firm* — F. Chau & Associates, LLC

(57) ABSTRACT

A voltage converter includes a power switching unit and an indirect sensing circuit. The power switching unit includes a plurality of power switches and a capacitor. The indirect sensing circuit receives an input voltage, a first voltage at a first node of the capacitor, and a second voltage at a second node of the capacitor, and generates first and second sensing output voltages based on the input voltage and the first and second voltages. A voltage difference between the first and second voltages is equal to a fractional multiple of the input voltage.

20 Claims, 20 Drawing Sheets

(56) References Cited

U.S. PATENT DOCUMENTS

| | | | |
|---|---|---|---|
| 7,285,944 B2 * | 10/2007 | Ishii | H02M 3/156 323/284 |
| 7,764,526 B1 | 7/2010 | Xing et al. | |
| 8,228,695 B2 | 7/2012 | Roesner et al. | |
| 8,411,474 B2 | 4/2013 | Roesner et al. | |
| 8,552,705 B2 * | 10/2013 | Buthker | H02M 3/1588 323/225 |
| 8,633,766 B2 | 1/2014 | Khlat et al. | |
| 8,786,248 B2 | 7/2014 | Nishizawa et al. | |
| 2014/0211520 A1 | 7/2014 | Zhang et al. | |
| 2015/0084608 A1 * | 3/2015 | Han | G01R 19/0084 323/271 |
| 2016/0149490 A1 * | 5/2016 | Nakamura | H02M 3/158 323/271 |

OTHER PUBLICATIONS

Sandra M et al., "Implementation of Resistor Based Protection Scheme for the Fault Conditions and Closed Loop Operation of a Three-Level DC-DC Converter", International Journal of Current Engineering and Technology, vol. 4, No. 2 (Apr. 2014), pp. 1129-1135.

Honggang Sheng et al., "A Fault Detection and Protection Scheme for Three-Level DC-DC Converters Based on Monitoring Flying Capacitor Voltage", IEEE Transactions on Power Electronics, vol. 27, No. 2, Feb. 2012, pp. 685-697.

* cited by examiner

FIG. 6

Example
R1=3R, R2=R, R3=3R, R4=R, R5=0.25R, R6=0.25R, R7=1.5R, R8=1.5R $$V1 = VDDM \cdot \frac{R2}{R1+R2} = VDDM \cdot \frac{1}{3+1} = VDDM \cdot \frac{1}{4}$$

$$V2 = VIN \cdot \frac{R4 \times \{R6+(R7//R8)\}}{R3 \times \{R4+R5+R6+(R7//R8)\}+R4 \times \{R5+R6+(R7//R8)\}}$$

$$+ VSSM \cdot \frac{R8 \times \{R5+(R3//R4)\}}{R7 \times \{R8+R5+R6+(R3//R4)\}+R8 \times \{R5+R6+(R3//R4)\}}$$

$$= VIN \cdot \frac{1 \times \{0.25+0.75\}}{3 \times \{1+0.25+0.25+0.75\}+1 \times \{0.25+0.25+0.75\}}$$

$$+ VSSM \cdot \frac{1.5 \times \{0.25+0.75\}}{1.5 \times \{1.5+0.25+0.25+0.75\}+1.5 \times \{0.25+0.25+0.75\}}$$

$$= VIN \cdot \frac{1}{3 \times \{1+0.25+0.25+0.75\}+1 \times \{0.25+0.25+0.75\}}$$

$$+ VSSM \cdot \frac{1.5}{1.5 \times \{1.5+0.25+0.25+0.75\}+1.5 \times \{0.25+0.25+0.75\}}$$

$$= VIN \cdot \frac{1}{8} + VSSM \cdot \frac{1}{4}$$

$Vth1 = VDDM \cdot \frac{1}{4}$ $Rth1 = 0.75R$ $Vth2 = VIN \cdot \frac{1}{8} + VSSM \cdot \frac{1}{4}$ $Rth2 = 0.5R + R9$ if $R9 = 0.25R$, $Rth2 = 0.75R$

VOLTAGE CONVERTER FOR CONTROLLING A VOLTAGE OF A FLYING CAPACITOR AND A VOLTAGE CONTROL METHOD THEREOF

CROSS-REFERENCE TO RELATED APPLICATION

This U.S. non-provisional patent application claims priority under 35 U.S.C. §119 to Korean Patent Application No. 10-2015-0063251, filed on May 6, 2015, in the Korean Intellectual Property Office, the disclosure of which is incorporated by reference herein in its entirety.

TECHNICAL FIELD

The present inventive concept relates to a voltage converter, and more particularly, to a DC-DC converter for controlling a voltage of a flying capacitor and a voltage control method of the voltage converter.

DISCUSSION OF THE RELATED ART

A DC-DC converter may be widely used in supplying power to electronic devices such as mobile phones, digital cameras, telecommunication systems, battery chargers, power supplies, or the like. In the case of a DC-DC converter in a three level mode, a voltage between both ends of a flying capacitor connected to power switches can be controlled to half of an input voltage. To this end, the voltage between both ends of the flying capacitor needs to be sensed.

SUMMARY

According to an embodiment of the present inventive concept, a voltage converter is provided. The voltage converter includes a power switching unit and an indirect sensing circuit. The power switching unit includes a plurality of power switches and a capacitor. The indirect sensing circuit receives an input voltage, a first voltage at a first node of the capacitor, and a second voltage at a second node of the capacitor, and generates first and second sensing output voltages based on the input voltage and the first and second voltages. A voltage difference between the first and second voltages is equal to a fractional multiple of the input voltage.

The indirect sensing circuit may include passive devices and may not include an active device.

The indirect sensing circuit may include a resistor network having a plurality of resistors.

The fractional multiple of the input voltage may be half of the input voltage.

The first sensing output voltage may correspond to 1/N (N is a real number greater than 1) times the first voltage, and the second sensing output voltage may correspond to a sum of a voltage of 1/N times the second voltage and a voltage of 1/(2N) times the input voltage.

The indirect sensing circuit may include first and second resistors connected between the first node and a ground node. The voltage of 1/N times the first voltage may be generated by dividing the first voltage using the first and second resistors.

The sum of a voltage of 1/N times the second voltage and the voltage of 1/(2N) times the input voltage may be generated based on the input voltage and a resistor network connected to the second node and a ground node.

The power switching unit may be configured to generate a voltage output having three levels.

The power switching unit may include four metal-oxide-semiconductor (MOS) transistors.

The first and second sensing output voltages may be used in a feedback control to switch the four MOS transistors.

According to an embodiment of the present inventive concept, a voltage converter is provided. The voltage converter includes a power switching unit, a sensing circuit sensing, and an auxiliary switching circuit. The power switching unit includes a plurality of power switches and a capacitor. The sensing circuit senses a voltage between first and second nodes of the capacitor to control the voltage between the first and second nodes to be a fractional multiple of an input voltage. The auxiliary switching circuit is configured to be connected to the first node. The auxiliary switching circuit is configured to charge or discharge the capacitor in response to an auxiliary switching control signal.

The fractional multiple voltage of an input voltage may be half of the input voltage.

The sensing circuit may include a non-inverting input node and an inverting input node. The non-inverting input node may be connected to the first node, and the inverting input node may be connected to the second node. The sensing circuit may output a voltage corresponding to the voltage between the first and second nodes.

The auxiliary switching circuit may include a first metal-oxide-semiconductor (MOS) transistor and a second MOS transistor. The first MOS transistor may include a source terminal to which the input voltage is applied and a drain terminal connected to the first node. The second MOS transistor may include a source terminal connected to the first node and a drain terminal connected to a ground.

The first MOS transistor may be configured to charge the capacitor when the voltage between the first and second nodes of the capacitor is lower than a first voltage level. The second MOS transistor may be configured to discharge the capacitor when the voltage between the first and second nodes of the capacitor is higher than a second voltage level greater than the first voltage level.

According to an embodiment of the present inventive concept, a voltage converter is provided. The voltage converter includes a power switching unit, an indirect sensing circuit, and an auxiliary switching circuit. The power switching unit includes a plurality of power switches and a capacitor. The indirect sensing circuit includes a resistor network. Two input nodes of the resistor network are respectively connected to first and second nodes of the capacitor. The indirect sensing circuit outputs first and second sensing output voltages through two output nodes of the resistor network, respectively. The auxiliary switching circuit charges or discharges the capacitor in response to an auxiliary switching control signal. The first sensing output voltage corresponds to a voltage at the first node, and the second sensing output voltage corresponds to a sum of a voltage at the second node and half of an input voltage applied through one end of a first switch of the auxiliary switching circuit.

The auxiliary switching circuit may include the first switching circuit and a second switching circuit. Another end of the first switching circuit and one end of the second switching circuit may be commonly connected to the first node of the capacitor.

Another end of the second switching circuit may be connected to a ground node.

Each of the first and second switching circuits may be a transistor.

The indirect sensing unit may not include an active device.

BRIEF DESCRIPTION OF THE FIGURES

The above and other features of the present inventive concept will become more apparent by describing in detail exemplary embodiments thereof with reference to the accompanying drawings in which:

FIG. 6 is a diagram illustrating a relationship between sensing output voltages and resistance values of the indirect sensing circuit of FIG. 4 according to an embodiment of the present inventive concept;

DETAILED DESCRIPTION

Figure 1:
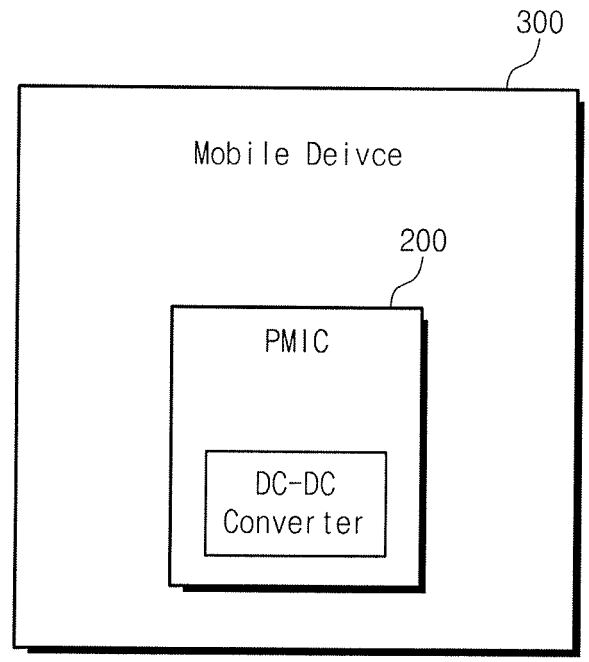
FIG. 1 is a diagram illustrating a DC-DC converter in a mobile device according to an embodiment of the present inventive concept.

Exemplary embodiments of the present inventive concept will be described more fully hereinafter with reference to the accompanying drawings. The present inventive concept may, however, be embodied in many different forms and should not be construed as limited to the embodiments set forth herein. In the drawings, the size and relative sizes of layers and regions may be exaggerated for clarity of illustration. Like numbers may refer to like elements throughout the specification and drawings. As used herein, the singular forms "a", "an" and "the" are intended to include the plural forms as well, unless the context clearly indicates otherwise. All the elements throughout the specification and drawings may be circuits.

FIG. 1 is a diagram illustrating a DC-DC converter in a mobile device 300 according to an embodiment of the present inventive concept.

Referring to FIG. 1, a power management IC (PMIC) 200 may include the DC-DC converter. The PMIC 200 may be applied to the mobile device 300 such as a smart phone, or the like.

When the DC-DC converter stably and efficiently operates, performance of the mobile device 300 may be increased.

Figure 2:
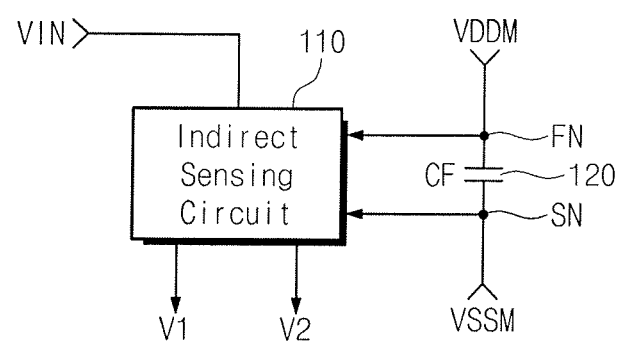
FIG. 2 is a block diagram of a part of a DC-DC converter having an indirect sensing circuit according to an embodiment of the present inventive concept.

To more accurately sense a voltage between two nodes of a flying capacitor, the DC-DC converter may have an indirect sensing circuit 110, according to an embodiment of the present inventive concept, as shown in FIG. 2.

FIG. 2 is a block diagram of a part of a DC-DC converter 100 having an indirect sensing circuit 110 according to an embodiment of the present inventive concept.

Referring to FIG. 2, the indirect sensing circuit 110 is connected to a first node FN and a second node SN of a flying capacitor 120 to generate first and second sensing output voltages V1 and V2. The indirect sensing circuit 110 receives an input voltage VIN. The indirect sensing circuit 110 may receive voltages VDDM and VSSM through the first node FN and the second node SN, respectively.

The indirect sensing circuit 110 indirectly controls a voltage VCF between the first and second nodes FN and SN of the flying capacitor 120 to be a fractional multiple of the input voltage VIN, e.g., 1/n*VIN (n is a positive integer greater than 1 and '*' is multiplication) by generating the first and second output voltages V1 and V2 such that a voltage (e.g., VSSM+1/n*VIN), which is the sum of a voltage VSSM of the second node SN and a fractional multiple of the input voltage VIN, is equal to a voltage VDDM of the first node FN. For example, the fractional multiple may be ½. For example, the indirect sensing circuit 110 may indirectly sense a voltage VCF between the first and second nodes FN and SN of the flying capacitor 120 by sensing the first and second output voltages V1 and V2 and control the voltage VCF to be a fractional multiple of the input voltage VIN (e.g., VIN/2).

Thus, when the voltage VCF between the first and second nodes FN and SN of the flying capacitor 120 is controlled to be a voltage of VIN/2, the indirect sensing circuit 110 does not directly senses the VCF (e.g., VDDM-VSSM) and senses the first and second sensing output voltages V1 and V2 such that the voltage VDDM of the first node FN is equal to a voltage VSSM+VIN/2. For example, the voltages V1 and V2 may correspond to the voltages VDDM and VSSM+VIN/2, respectively.

Figure 3:
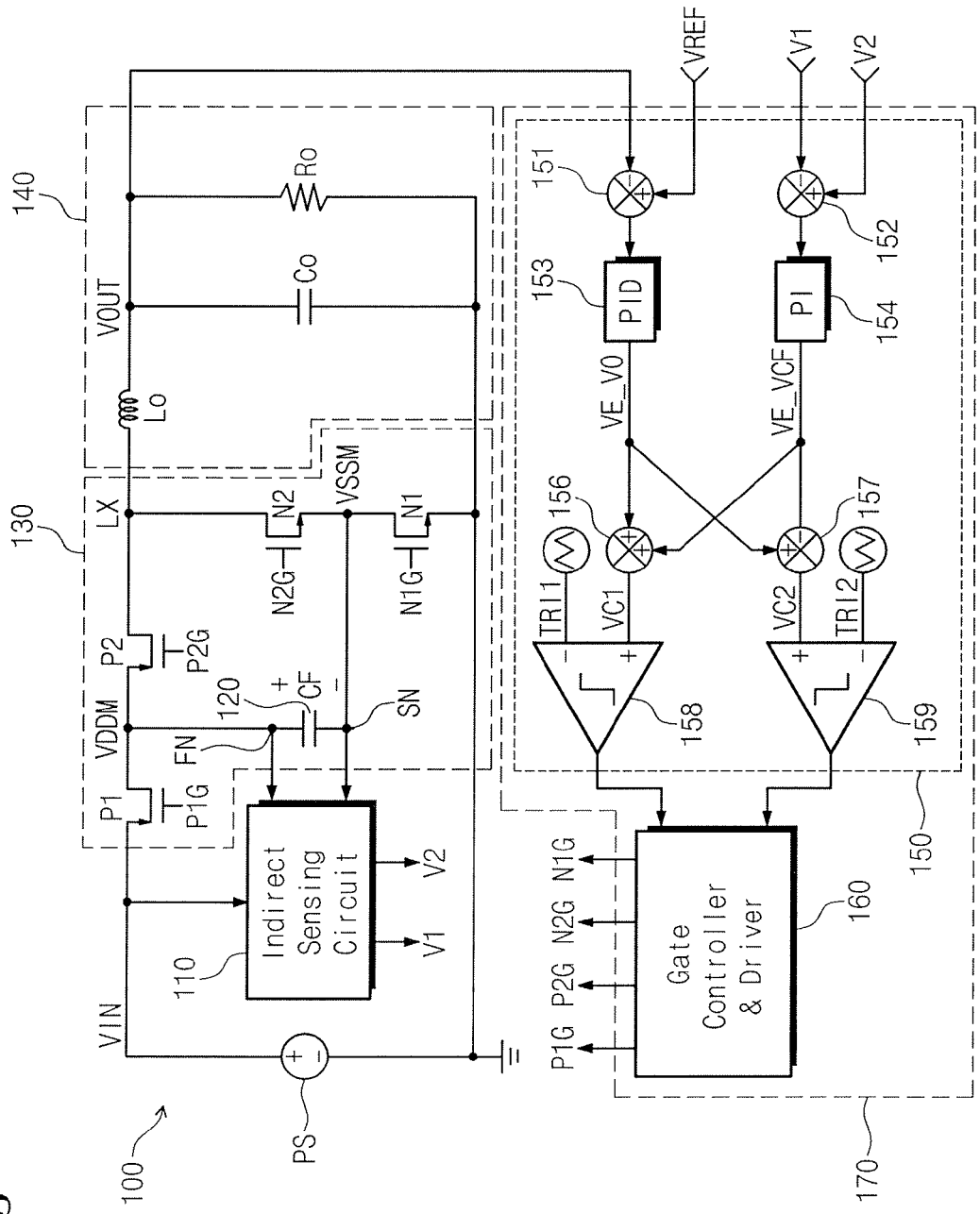
FIG. 3 is a circuit diagram of the DC-DC converter including the indirect sensing circuit of FIG. 2 according to an embodiment of the present inventive concept.

FIG. 3 is a circuit diagram of the DC-DC converter 100 including the indirect sensing circuit 110 of FIG. 2 according to an embodiment of the present inventive concept.

Referring to FIG. 3, the DC-DC converter 100 may include a plurality of power switches P1, P2, N1 and N2 and a power switching unit 130 including the flying capacitor CF 120. In addition, the DC-DC converter 100 may include the indirect sensing circuit 110, a power output unit 140 and a feedback control circuit 170.

The power output unit 140 may include an inductor Lo, a capacitor Co, and a load resistor Ro.

The feedback control circuit 170 may include first and second adders 151 and 152, a proportional integral controller 154, third and fourth adders 156 and 157, and a feedback control unit 150 including first and second comparators 158 and 159. The feedback control circuit 170 may further include a gate controller & a driver 160.

To maintain the voltage VCF of the flying capacitor CF 120 at a voltage level of VIN/2, the feedback control circuit 170 receives the first and second sensing output voltages V1 and V2 through the adder 152 to control the power switching unit 130.

A voltage TR12 of triangle wave shape that swings at a regular frequency is applied to an inverting stage (−) of the first comparator 159, and an output VC2 of the fourth adder 157 is applied to a non-inverting stage (+) of the second comparator 159. A phase of the voltage applied to the inverting stage (−) of the first comparator 159 and a phase of the voltage applied to the non-inverting stage (+) of the second comparator 159 may have a difference of 180° from each other.

The gate controller and the driver 160 in the feedback control circuit 170 generate switching control signals P1G, P2G, N1G and N2G for switching the power switches P1, P2, N1 and N2, respectively.

The input voltage VIN provided from a direct current power supply PS is applied to the indirect sensing circuit 110.

Figure 4:
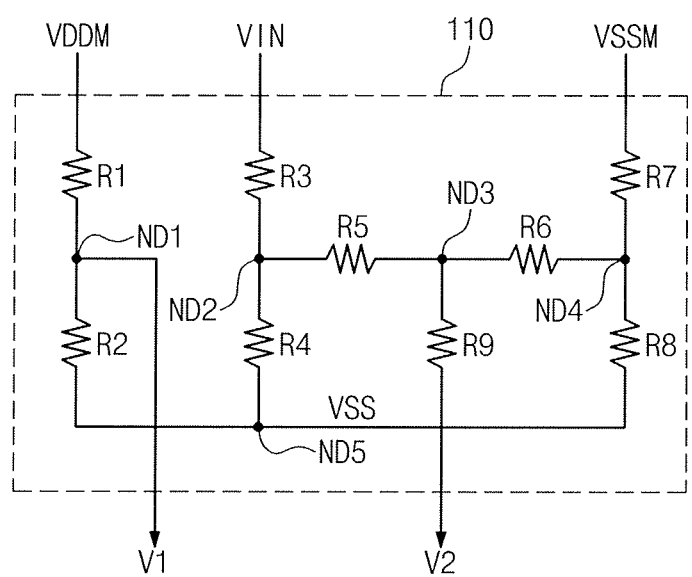
FIG. 4 is a circuit diagram of the indirect sensing circuit of FIG. 2 according to an embodiment of the present inventive concept.

The indirect sensing circuit 110 may include passive devices without active devices, as illustrated in FIG. 4. For example, when a resistor network is formed by a connection of a plurality of resistors, unique advantages of the indirect sensing circuit 110 are provided.

FIG. 4 is a circuit diagram of the indirect sensing circuit 110 of FIG. 2 according to an embodiment of the present inventive concept.

Referring to FIG. 4, a resistor network includes first through ninth resistors R1 to R9.

The voltage VDDM of the first node FN is applied to one end of the first resistor R1. The input voltage VIN is applied to one end of the third resistor R3. The voltage VSSM of the second stage SN is applied to one end of the seventh resistor R7.

The first sensing output voltage V1 is provided from a connection node ND1 between the other end of the first resistor R1 and one end of the second resistor R2.

The second sensing output voltage V2 is provided from one end of the ninth resistor R9, the other end of which is connected to a connection node ND3. The connection node ND3 is connected to one end of the fifth resistor R5 and to one end of the sixth resistor R6. The other end of the fifth resistor R5 is connected to a connection node ND2 and the other end of the sixth resistor R6 is connected to a connection node ND4. The fifth resistor R5 is connected between the connection node ND2 and the connection node ND3, and the sixth resistor R6 is connected between the connection node ND3 and the connection node ND4.

The connection node ND2 connects the other end of the third resistor R3 and one end of the fourth resistor R4. The connection node ND4 connects the other end of the seventh resistor R7 and one end of the eighth resistor R8.

The other end of the fourth resistor R4 and the other end of the eighth resistor R8 are connected to each other through a ground node N5. In addition, the other end of the second resistor R2 is connected to the ground node N5.

Figure 5:
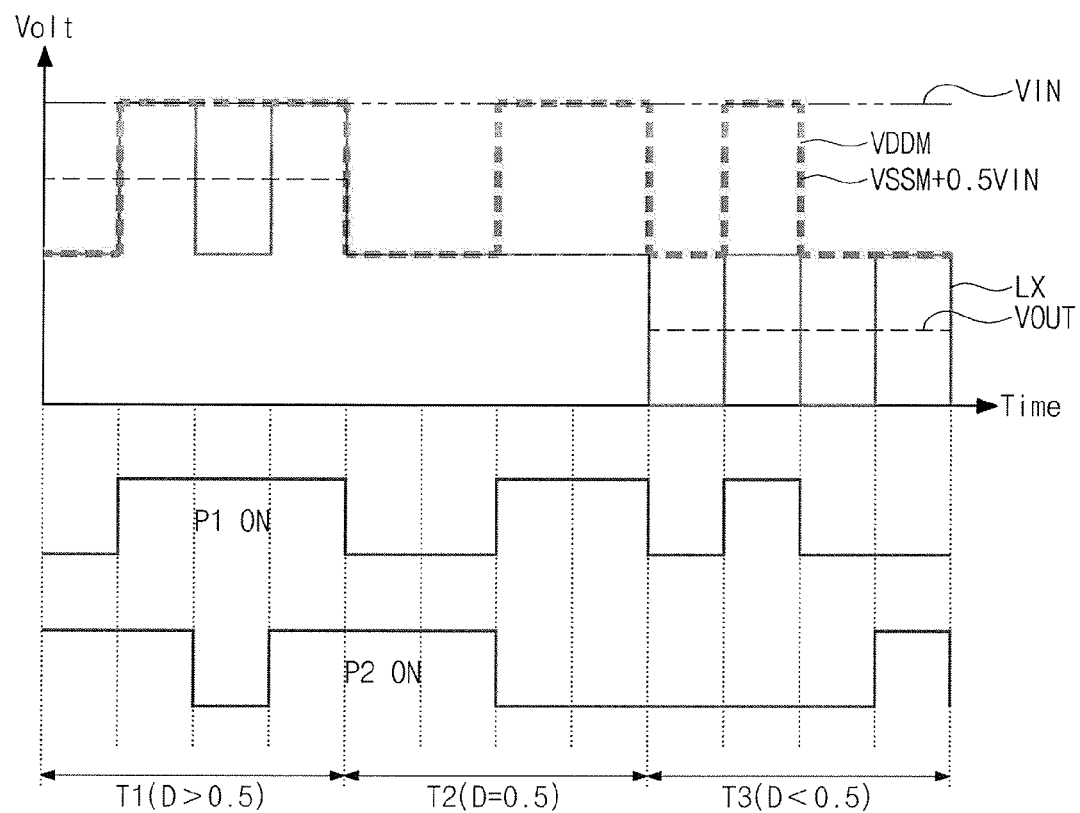
FIG. 5 is a timing diagram of the DC-DC converter of FIG. 3 according to an embodiment of the present inventive concept.

FIG. 5 is a timing diagram of the DC-DC converter 100 of FIG. 3 according to an embodiment of the present inventive concept.

A horizontal axis represents a time and a vertical axis represents a voltage level.

In the case that a duty ratio D of an input to an output is greater than 0.5, voltage waveforms such as illustrated in a time period T1 may appear.

In the case that a duty ratio of an input to an output is smaller than 0.5, voltage waveforms such as illustrated in a time period T3 may appear.

In the case that a duty ratio of an input to an output is 0.5, voltage waveforms such as illustrated in a time period T2 may appear.

In FIG. 5, a VIN represents a waveform of an input voltage VIN which is provided from the direct current power supply PS of FIG. 3. A VDDM represents a waveform of the first sensing output voltage V1 of the indirect sensing circuit 110. A VSSM+0.5 VIN represents a waveform of the second sensing output voltage V2 of the indirect sensing circuit 110.

An LX represents a waveform of a voltage of an input node LX of the inductor Lo of FIG. 3. A VOUT represents a waveform of a voltage of an output node VOUT of the inductor Lo of FIG. 3.

Since a waveform of LX swings to a level of the input voltage VIN or a ground level with respect to a half level of the input voltage VIN, an operation of the 3-level DC-DC converter 100 is realized.

For example, in the second time period T2, the power switches P1 and P2, each of which may be a P-type metal-oxide-semiconductor (MOS) transistor, swing in a complementary manner to each other, and the power switches N1 and N2, each of which may be an N-type MOS transistor, swing in a complementary manner to each other. For example, when the power switches P1 and N2 are turned on, the power switches P2 and N1 are turned off, and thus, a charge path is formed. In addition, for example, when the power switches P2 and N1 are turned on, the power switches P1 and N2 are turned off, and thus, a discharge path is formed.

In an embodiment of the present inventive concept, the first and second sensing output voltages V1 and V2 are generated using the indirect sensing circuit 110. Thus, the feedback control circuit 170 controls a voltage between the nodes FN and SN of the flying capacitor 120 to a target level by performing a feedback control so that the voltage VDDM corresponding to the first sensing output voltage V1 becomes equal to the voltage VSSM+0.5 VIN corresponding to the second sensing output voltage V2.

In the case of sensing a voltage between both ends FN and SN of the flying capacitor 120 using resistors, diodes, and capacitors, power capacity of capacitors may have to be larger than power capacity of the flying capacitor 120, and thus, resistors may have to have a high resistance value. According to an embodiment of the present inventive concept, a voltage between both ends FN and SN of the flying capacitor 120 can be accurately sensed by a resistor network without using diodes and capacitors. In this case, the number of circuit devices may be reduced, and resistors having a relatively small resistance values may be used, and thus, it is relatively easy to integrate resistors into a single chip. In an exemplary embodiment of the present inventive concept, since diodes are not used in a sensing circuit (e.g., 110 of FIG. 3), a sensing error occurring according to a positive diode turn-on voltage and a negative diode turn-on voltage may be removed.

Further, in an embodiment of the present inventive concept, since an active circuit such as a differential to single circuit (D2S) is not used, a circuit design may become relatively simple. An offset voltage that may occur at differential input stages may not be an issue. Thus, since there is no need to correct an offset voltage by a trimming operation, a testing process may not be needed, and thus, a testing time may not be needed. Further, reduction of a sensing speed due to a bandwidth limit of a differential to single circuit (D2S) may not occur, and power consumption occurring when increasing a sensing speed of the differential to single circuit (D2S) and a linear operating region of the differential to single circuit (D2S) may be reduced.

In the case of controlling the voltage VCF between the first and second nodes FN and SN of the flying capacitor CF 120 to half of the input voltage VIN, the indirect sensing circuit 110 of the DC-DC converter 100 may generate the first and second sensing output voltages V1 and V2 such that a voltage (e.g., VSSM+0.5 VIN), which is the sum of the voltage of the second node SN and the fractional multiple of the input voltage VIN is equal to the voltage VDDM of the first node FN. For example, the indirect sensing circuit 110 may receive the input voltage VIN, the voltage VDDM at the first node FN, and the voltage VSSM at the second node SN and may generate first and second sensing output voltages V1 and V2 based on the input voltage VIN and the voltages VDDM and VSSM, such that the voltage VCF between the first and second nodes FN and SN is equal to a fractional multiple of the input voltage VIN.

Figure 7:
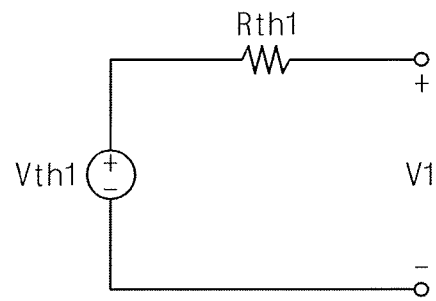
FIG. 7 is an equivalent circuit diagram corresponding to a first sensing output voltage of FIG. 4 according to an embodiment of the present inventive concept.
Figure 8:
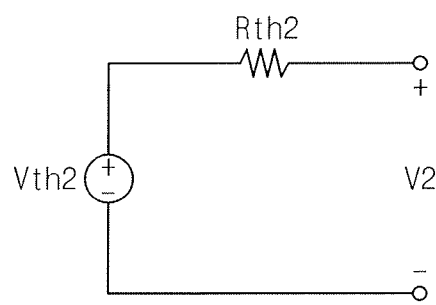
FIG. 8 is an equivalent circuit diagram corresponding to a second sensing output voltage of FIG. 4 according to an embodiment of the present inventive concept.

FIG. 6 is a diagram illustrating a relationship between sensing output voltages and resistance values of the indirect sensing circuit 110 of FIG. 4 according to an embodiment of the present inventive concept. FIG. 7 is an equivalent circuit diagram corresponding to a first output sensing output voltage V1 of FIG. 4 according to an embodiment of the present inventive concept. FIG. 8 is an equivalent circuit diagram corresponding to a second sensing output voltage V2 of FIG. 4 according to an embodiment of the present inventive concept.

To control the voltage VCF (e.g., VDDM-VSSM) between the first and second nodes FN and SN of the flying capacitor 120 to be equal to the half of the input voltage VIN/2, the DC-DC converter 100 does not directly sense the voltage VCF and do sense the first and second output sensing voltages V1 and V2 to indirectly control the voltage V1 to be equal to the voltage V2. Here, the voltage V1 may correspond to the voltage VDDM and the voltage V2 may correspond to the voltage VSSM+VIN/2. Thus, when the V1 becomes equal to the V2, a voltage level of VCF becomes a voltage level of VIN/2.

Referring to FIG. 7, a Thevenin equivalent voltage Vth1, which may correspond to the voltage V1, may be represented by a mathematical formula 1.

$$Vth1 = VDDM \cdot \frac{R2}{R1 + R2} \quad \text{[mathematical formula]}$$

Referring to FIG. 8, a Thevenin equivalent voltage Vth2, which may correspond to the voltage V2, may be represented by a mathematical formula 2.

$$Vth2 = \\ VIN \cdot \frac{R4 \times \{R6 + (R7 // R8)\}}{R3 \times \{R4 + R5 + R6 + (R7 // R8)\} + R4 \times \{R5 + R6 + (R7 // R8)\}} + \\ VSSM \cdot \frac{R8 \times \{R5 + (R3 // R4)\}}{R7 \times \{R8 + R5 + R6 + (R3 // R4)\} + R8 \times \{R5 + R6 + (R3 // R4)\}} \quad \text{[mathematical formula 2]}$$

In an embodiment of the present inventive concept, referring to FIGS. 4 and 6, when a resistance value of the first resistor R1 is equal to a resistance value of 3R, a resistance value of the second resistor R2 is equal to a resistance value of R, a resistance value of the third resistor R3 is equal to a resistance value of 3R, a resistance value of the fourth resistor R4 is equal to a resistance value of R, a resistance value of the fifth resistor R5 is equal to a resistance value of 0.25R, a resistance value of the sixth resistor R6 is equal to a resistance value of 0.25R, a resistance value of the seventh resistor R7 is equal to a resistance value of 1.5R, and a resistance value of the eighth resistor R8 is equal to a resistance value of 1.5R, Vth1, Vth2, Rth1, and Rth2 may be represented by mathematical formulas as shown below.

$$Vth1 = VDDM \cdot \frac{1}{4} \quad \text{[mathematical formula 3]}$$
$$Rth1 = 0.75R$$

$$Vth2 = VIN \cdot \frac{1}{8} + VDDM \cdot \frac{1}{4} \quad \text{[mathematical formula 4]}$$
$$Rth2 = 0.5R + R9$$
if $R9 = 0.5R$,
$$Rth2 = 0.75R$$

Thus, when controlling the voltage V1 to be equal to the voltage V2, (e.g., when controlling the voltage VDDM to be equal to the voltage VSSM+VIN/2), the voltage VCF (e.g., VDDM-VSSM) can be equal to the voltage VIN/2. A resistance value of the Thevenin equivalent resistor (e.g., Rth1 or Rth2) is 0.75R. Thus, since the resistance value of the Thevenin equivalent resistor (e.g., 0.75R) is much smaller than a resistance value, which, e.g., ranges from 3R to 4R, between a ground and each of an input node of the input voltage VIN, the first node SN, and the second node SN, power consumption of the indirect sensing circuit 110 may be reduced and a sensing speed may be increased.

When the resistors R1 to R8 have resistance value ratios, as shown in FIG. 6, the first sensing output voltage V1 may correspond to a voltage of VDDM/N (N is a real number equal to or greater than 1), and the second sensing output voltage V2 may correspond to the voltage VSSM/N+VIN/2N, which is the sum of the voltage VSSM/N and the voltage VIN/2N. For example, N is 4 in the case described with reference to FIG. 6.

As described above, according to an embodiment of the present inventive concept, the DC-DC converter 100 may accurately perform a sensing operation using a resistor network by sensing the voltage V1 (e.g., corresponding to the voltage VDDM) and the voltage V2 (e.g., corresponding to the voltage VSSM+VIN/2) and performing a feedback control on the voltages V1 and V2 without directly sending the voltage VCF between the two nodes FN and SN of the flaying capacitor 120.

Thus, in an embodiment of the present inventive concept, an active device and an external device are not used when sensing the voltage VCF of the flying capacitor 120, and thus, a clamping generated due to the active device or the external device is removed, and thus, an offset voltage is not generated during a sensing operation. Therefore, a separate test circuit and a testing time for an offset voltage calibration may not be needed. Thus, a cost and a time for the sensing operation may be reduced. In addition, since no external device is used at the outside of a chip, the cost and the mounting area for the sensing operation may be reduced.

Figure 9:
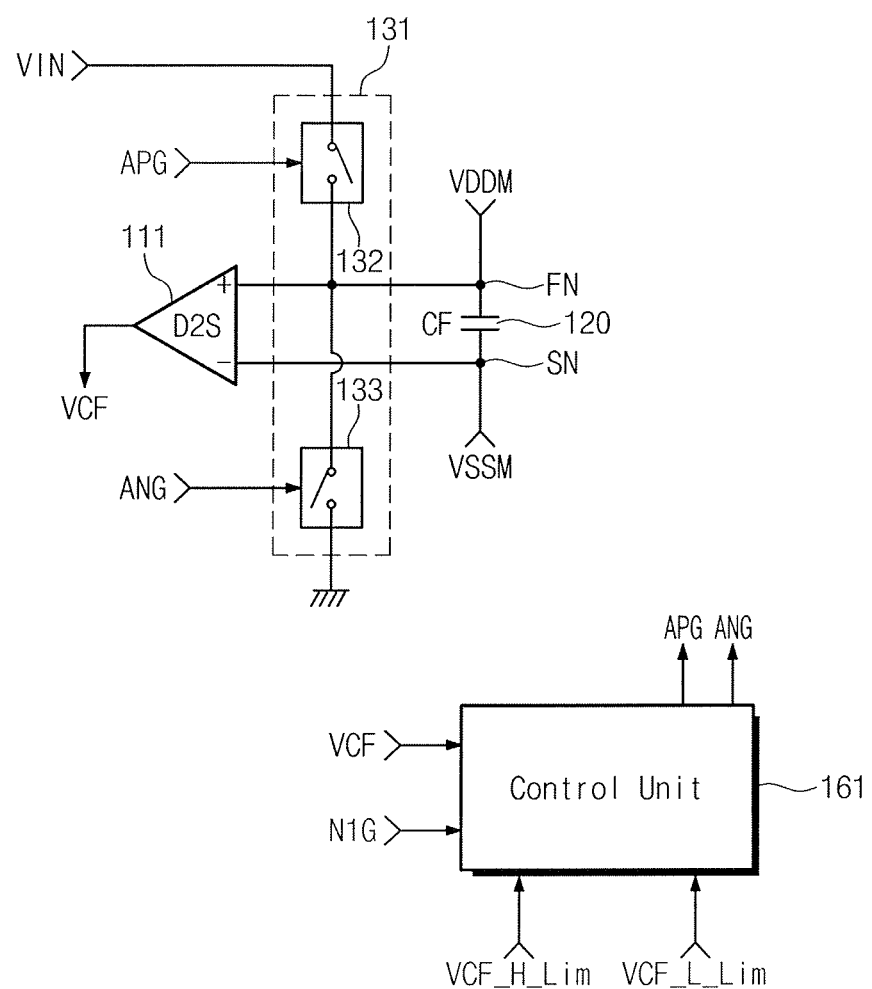
FIG. 9 is a block diagram of a part of a DC-DC converter having an auxiliary switching circuit according to an embodiment of the present inventive concept.

With reference to FIG. 9, a DC-DC converter, according to an embodiment of the present inventive concept, capable of accurately controlling a voltage of a flying capacitor, regardless of how severely an input voltage VIN is changed and how much an inductor current flows, and a voltage control method of the DC-DC converter will be described.

FIG. 9 is a block diagram of a part of a DC-DC converter having an auxiliary switching circuit according to an embodiment of the present inventive concept.

Referring to FIG. 9, the DC-DC converter may include a sensing circuit 111 that senses a voltage VCF between first and second nodes FN and SN of a flying capacitor 120 in a power switching unit (e.g., 130 of FIG. 10) and an auxiliary switching circuit 131. The auxiliary switching circuit 131 may include first and second auxiliary power switches 132 and 133.

The sensing circuit 111 senses the voltage VCF between the first and second nodes FN and SN and controls so that the voltage VCF between the first and second nodes FN and SN becomes a fractional multiple (e.g., ½) of the input voltage VIN.

The auxiliary switching circuit 131 may be connected to the first node FN and may be configured to charge or discharge a voltage of the flying capacitor CF in response to auxiliary switching control signals APG and ANG. For example, the input voltage VIN may be applied through one end of the auxiliary power switch 132, and the other end of the auxiliary power switch 132 may be commonly connected to the first node FN and a non-inverting stage (+) of the sensing circuit 111. The ground voltage may be applied through one end of the auxiliary power switch 133, and the other end of the auxiliary power switch 133 may be commonly connected to the first node FN and the non-inverting stage (+) of the sensing circuit 111. An inverting stage (−) of the sensing circuit 111 may be connected to the second node SN. The auxiliary power switch 132 may be opened or closed in response to the switching control signal APG, and the auxiliary power switch 133 may be opened or closed in response to the switching control signal ANG. The auxiliary switching control signals APG and ANG may be provided from a switching control unit 161.

Figure 10:
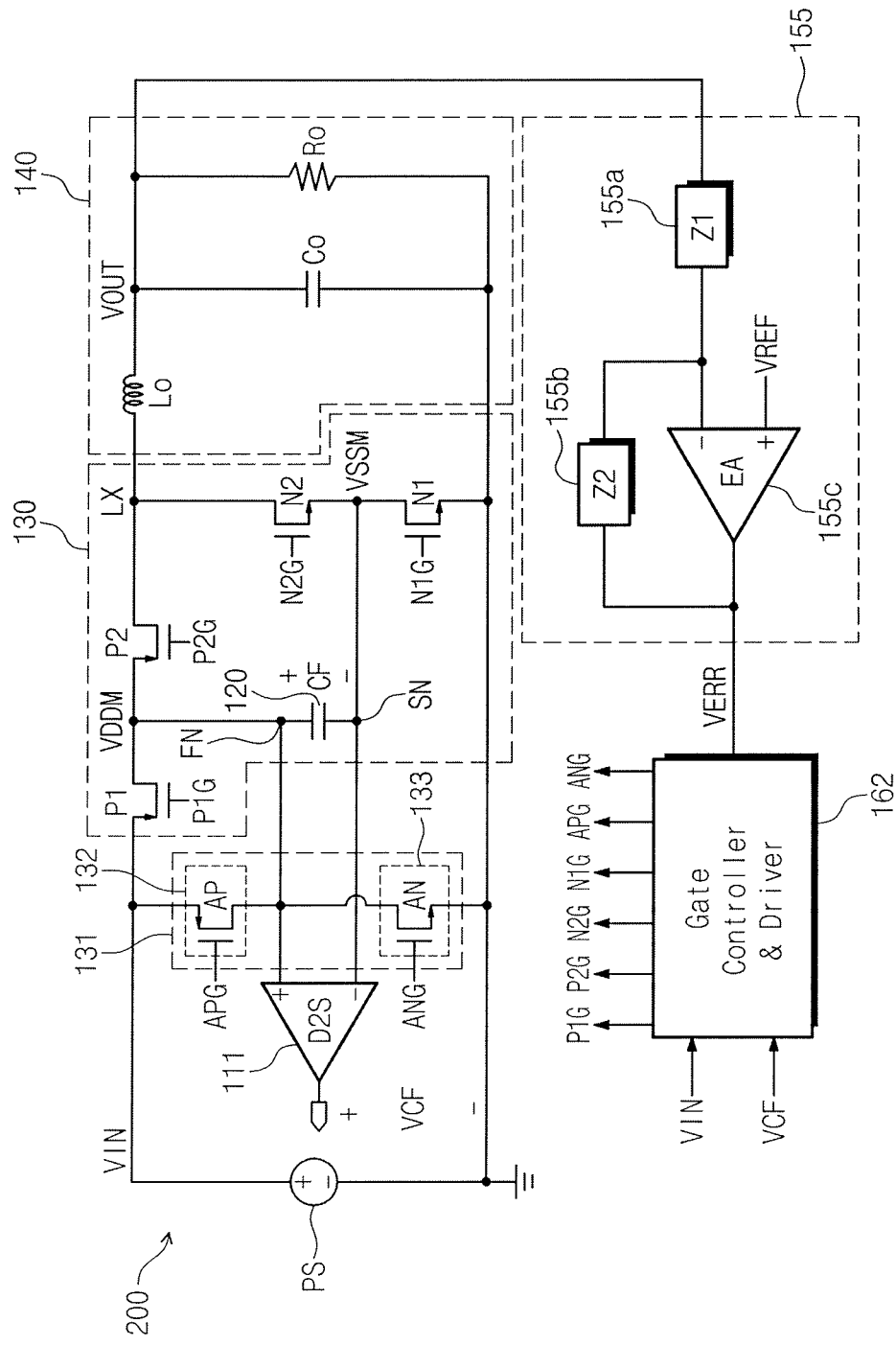
FIG. 10 is a circuit diagram of the DC-DC converter having the auxiliary switching circuit of FIG. 9 according to an embodiment of the present inventive concept.

FIG. 10 is a circuit diagram of the DC-DC converter having the auxiliary switching circuit 131 of FIG. 9 according to an embodiment of the present inventive concept.

Referring to FIG. 10, the auxiliary switching circuit 131 includes the auxiliary power switches 132 and 133. The auxiliary power switch 132 may be a P-type MOS transistor AP. The auxiliary power switch 133 may be an N-type MOS transistor AN.

In the P-type MOS transistor AP, which is a first MOS transistor in FIG. 10, a source-drain channel is connected between the input voltage VIN and the first node FN. The auxiliary switching control signal APG is applied to a gate of the P-type MOS transistor AP.

In the N-type MOS transistor AN, which is a second MOS transistor in FIG. 10, a source-drain channel is connected between the first node FN and a ground. An auxiliary switching control signal ANG is applied to a gate of the N-type MOS transistor AN. When the auxiliary switching control signal APG has a first level (e.g., a high level), the auxiliary switching control signal ANG may have the first level. When the auxiliary switching control signal APG has a second level (e.g., a low level), the auxiliary switching control signal ANG may have the second level. Thus, when the P-type MOS transistor AP is turned on, the N-type MOS transistor AN may be turned off. When the P-type MOS transistor AP is turned off, the N-type MOS transistor AN may be turned on. Although FIG. 10 illustrates that the P-type MOS transistor AP and the N-type MOS transistor AN operate in a complementary manner, the present inventive concept is not limited thereto.

The DC-DC converter 200 may include a power switching unit 130 including a plurality of power switches P1, P2, N1 and N2 and a flying capacitor CF 120. The DC-DC converter 200 may include a sensing circuit 111, a power output unit 140, a feedback control unit 155 and a gate controller & driver 162.

The power output unit 140 may include an inductor Lo, a capacitor Co, and a load resistor Ro.

The feedback control unit 155 may include first and second impedance devices 155a and 155b and an error amplifier 155c.

To maintain the voltage VCF of the flying capacitor CF 120 at the voltage VIN/2, the feedback control unit 155 receives an output voltage VOUT to control the power switching unit 130 and the auxiliary switching circuit 131.

The gate controller & driver 162 generates switching control signals P1G, P2G, N1G, N2G, APG, and ANG for switching the power switches P1, P2, N1, N2, the P-type MOS transistor AP (e.g., the auxiliary power switch 132) and the n-type MOS transistor AN (e.g., the auxiliary power switch 133), respectively.

The input voltage VIN, which is provided from the direct current power supply PS, is applied to a source of the P-type MOS transistor AP and a source of the power switch P1.

In FIG. 10, a waveform at an input node LX of the inductor Lo swings to a level of the input voltage VIN or a ground level with respect to a half level of the input voltage VIN, and thus, an operation of the 3-level DC-DC converter 200 may be realized.

The power switches P1 and P2 in the power switching unit 130 are switched in a complementary manner to each other and the power switches N1 and N2 in the power switching unit 130 are also switched in a complementary manner to each other. For example, when the power switches P1 and N2 are turned on, the power switches P2 and N1 are turned off, and thus, the flying capacitor 120 may be charged. When the power switches P2 and N1 are turned on, the power switches P1 and N2 are turned off, and thus, the flying capacitor 120 may be discharged.

In the DC-DC converter operating in a 3-level mode, a voltage VCF between both nodes FN and SN of the flying capacitor CF 120 is controlled to be half of the input voltage VIN.

When a DC-DC converter (e.g., 100) operates in a 3-level mode, charging and discharging operations on the flying capacitor CF 120 occur according to an output current $I_L$ of the inductor Lo, and the voltage VCF is controlled using a time difference between the charging operation and the discharging operation. For example, when the output current $I_L$ of the inductor Lo is large, it is relatively easy to control the voltage VCF to the voltage VIN/2. In addition, when the output current $I_L$ of the inductor Lo is small, it is relatively difficult to control the voltage VCF to the voltage VIN/2. For example, when the output current $I_L$ of the inductor Lo is small, a control on the voltage VCF may not be performed and a level difference between the voltage VCF and VIN/2 may be increased.

Referring to FIG. 10, the differential to single circuit (D2S) 111 (e.g., an active circuit) is used as a sensing circuit, and thus, the number of external devices may be reduced. In this case, a non-inverting stage (+) of the differential to single circuit (D2S) 111 is connected to the first node FN of the flying capacitor 120 and an inverting stage (−) of the differential to single circuit (D2S) 111 is connected to the second node SN of the flying capacitor 120. By using the differential to single circuit (D2S) 111, a voltage between the first and second nodes FN and SN of the flying capacitor 120 is sensed as the voltage VCF with respect to the ground. The sensed voltage VCF is applied to the gate controller & the driver 162 and the feedback control unit 155 performs a feedback control so that the voltage VCF becomes the voltage VIN/2.

Since the voltage VCF is controlled while the flying capacitor 120 is repeatedly charged and discharged through the output current $I_L$ of the inductor Lo, a VCF control loop gain ($H_{CF}$ (s)) and an amount of the output current $I_L$ have a proportional relationship to each other. For example, when the output current $I_L$ is decreased, a DC gain of the $H_{CF}$ (s) is reduced, and thus, a difference between the voltage VCF and VIN/2 is increased. For example, the output current $I_L$ is zero, the voltage VCF may not be controlled.

In an embodiment of the present inventive concept, to solve those problems, the DC-DC converter 200 includes the auxiliary switching circuit 131 including the P-type MOS transistor AP and the N-type MOS transistor AN.

Based on the auxiliary switching circuit 131, the DC-DC converter 200 can limit a difference between the voltage VCF and VIN/2 within a predetermined value, even in a low $I_L$ region. When a voltage VCF of the flying capacitor 120 is smaller than a lower limit voltage level, the P-type MOS transistor AP in the auxiliary switching circuit 131 charges the flying capacitor 120. When a voltage of the flying capacitor 120 is greater than an upper limit voltage level, the N-type MOS transistor AN in the auxiliary switching circuit 131 discharges the flying capacitor 120.

Figure 11:
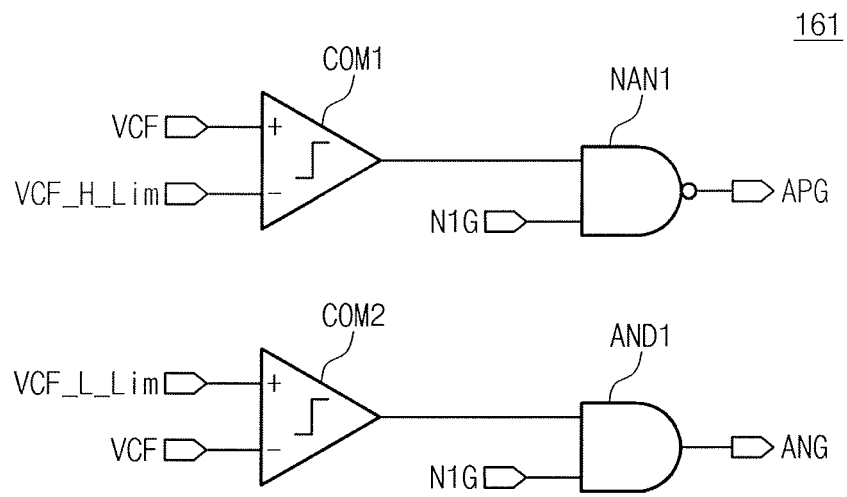
FIG. 11 is a circuit diagram illustrating a switching control unit for supplying auxiliary control signals to the auxiliary switching circuit of FIG. 9 according to an embodiment of the present inventive concept.

To do this, the auxiliary switching control signals APG and ANG being applied to the auxiliary switching circuit 131 may be generated by the switching control unit 161 of FIG. 11 (e.g., the switching control unit 161 of FIG. 9).

Since the P-type and N-type MOS transistors AP and AN operate by the voltage VCF without regard to an amount of the output current $I_L$, even in the case that the output current $I_L$=0, a difference between the voltages VCF and VIN/2 can be controlled within a value of ΔV.

Thus, the DC-DC converter 200 according to an embodiment of the present inventive concept may control the difference between the voltage VCF and the voltage VIN/2 to be within a desired value (e.g., a preset value) regardless of an amount of the output current IL by using the auxiliary switching circuit 131, may operate in the 3-level mode, and thus, reliability and performance of the DC-DC converter 200 in the 3-level mode may be increased without an increase of complexity and area. This may be because the auxiliary switching circuit 131 is embedded to the DC-DC converter 200 in a single chip without adding external devices.

FIG. 11 is a circuit diagram illustrating a switching control unit 161 for supplying auxiliary control signals APG and ANG to the auxiliary switching circuit 131 of FIG. 9.

Referring to FIG. 11, the switching control unit 161 may include first and second comparators COM1 and COM2, a NAND gate NAN1, and an AND gate AND1.

The voltage VCF sensed by the sensing circuit 111 is applied to a non-inverting stage (+) of the first comparator COM1 and an inverting stage (−) of the second comparator COM2.

The upper limit level VCF_H_Lim and the lower limit level VCF_L_Lim of the voltage VCF are applied to an inverting stage (−) of the first comparator COM1 and a non-inverting stage (+) of the second comparator COM2, respectively. For example, the upper limit level VCF_H_Lim and the lower limit level VCF_L_Lim may be preset values. An output of the first comparator COM1 is provided to one input of the NAND gate NAN1, and a switching control signal NIG is provided to the other input of the NAND gate NAN1. The switching control signal NIG is a signal which is applied to a gate of the N-type MOS transistor N1.

An output of the second comparator COM2 is provided to one input of the AND gate AND1, and the switching control signal NIG is provided to the other input of the AND gate AND1.

Figure 12:
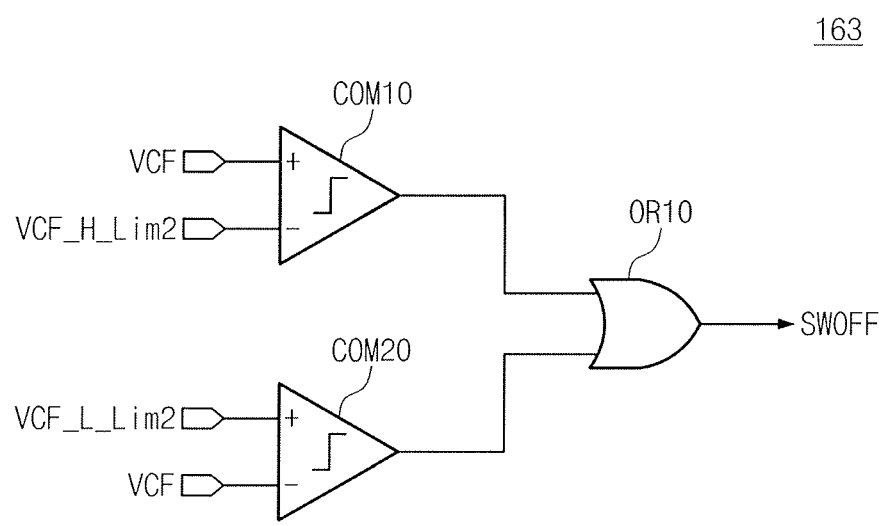
FIG. 12 is a circuit diagram illustrating a switch off control unit of the DC-DC converter of FIG. 10 according to an embodiment of the present inventive concept.

FIG. 12 is a circuit diagram illustrating a switch off control unit 163 of the DC-DC converter of FIG. 10 according to an embodiment of the present inventive concept.

The switching off control unit 163 may include first and second comparators COM10 and COM20 and an OR gate OR1.

The voltage VCF sensed by the sensing circuit 111 is applied to each of a non-inverting stage (+) of the first comparator COM10 and an inverting stage (−) of the second comparator COM20.

An upper limit level VCF_H_Lim2, which is set for switching off, is applied to an inverting stage (−) of the first comparator COM10. A lower limit level VCF_L_Lim2, which is set for switching off, is applied to a non-inverting stage (+) of the second comparator COM20. The upper limit level VCF_H_Lim2 is set to be higher than the upper limit level VCF_H_Lim, and the lower limit level VCF_L_Lim2 is set to be lower than lower limit level VCF_L_Lim.

An output of the first comparator COM10 is provided to one input of the OR gate OR10, and an output of the second comparator COM20 is provided to the other input of the OR gate OR10.

In the case that the sensed voltage VCF of the flying capacitor 120 is higher than the upper limit level VCF_H_Lim2 or is lower than the lower limit level VCF_L_Lim2, the OR gate OR10 outputs a switching off signal SWOFF to protect the circuit. In the case that the switching off signal SWOFF is output from the switching off control unit 163, an operation of the gate controller & driver 162 is disabled.

In the case that the voltage VCF is beyond an allowable range (e.g., when VCF>VCF_H_Lim2, or VCF<VCF_L_Lim2), a switching operation of the power switches P1, P2, N1 and N2 is off, and thus, the first and second nodes FN and SN of the flying capacitor 120 are prevented from being supplied with a voltage higher or lower than a desired level. Thus, a voltage VDS between a drain and a source of each of the power switches P1, P2, N1 and N2 is maintained to be within an allowable value, and thus, the power switches P1, P2, N1 and N2 are protected from an overvoltage.

The switching off control unit 163 is prepared to protect a DC-DC converter (e.g., 200 of FIG. 10).

Figure 13:
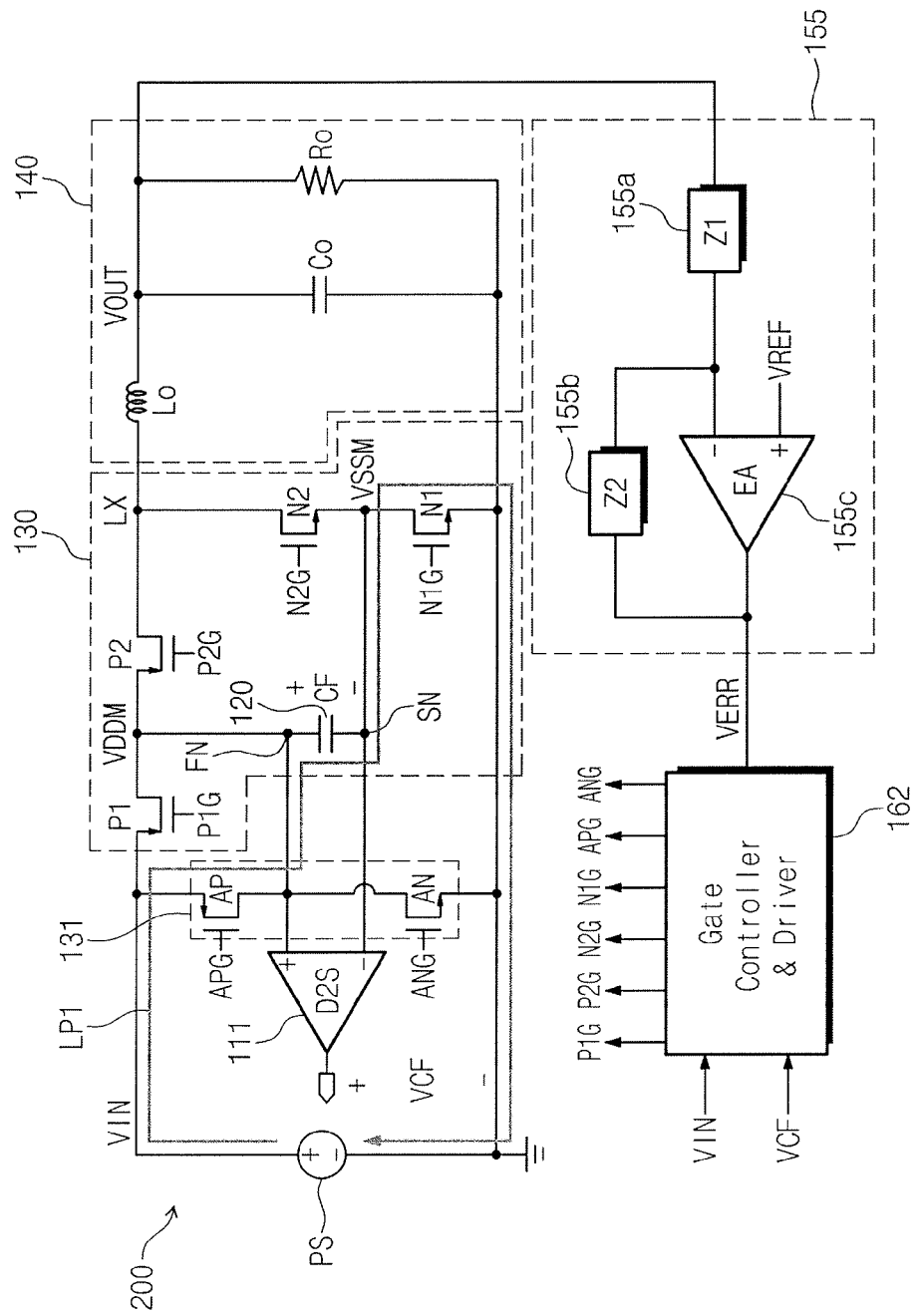
FIG. 13 is a diagram illustrating a charge path of the DC-DC converter of FIG. 10 according to an embodiment of the present inventive concept.
Figure 14:
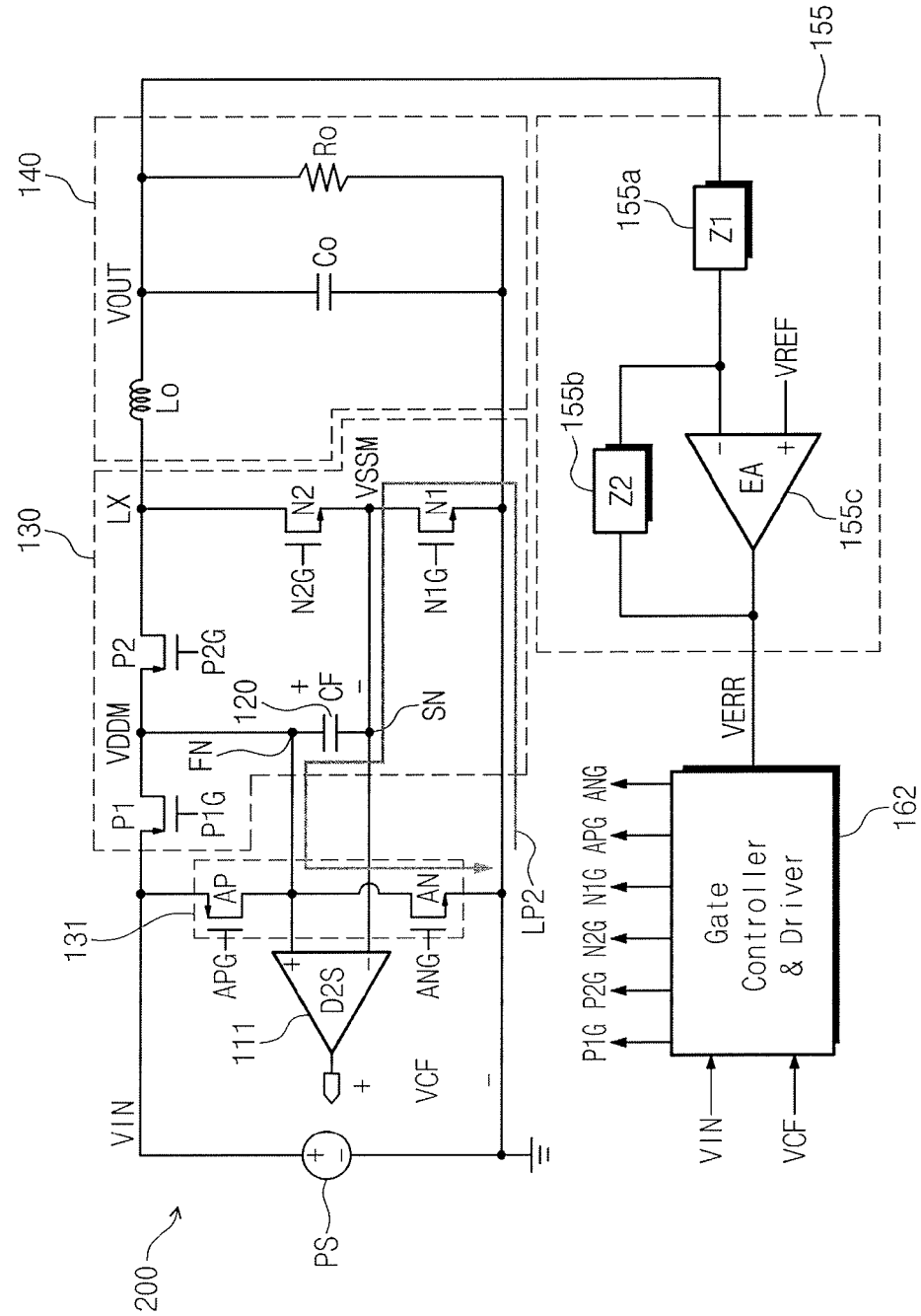
FIG. 14 is a diagram illustrating a discharge path of the DC-DC converter of FIG. 10 according to an embodiment of the present inventive concept.

FIG. 13 is a diagram illustrating a charge path of the DC-DC converter 200 of FIG. 10 according to an embodiment of the present inventive concept. FIG. 14 is a diagram illustrating a discharge path of the DC-DC converter of FIG. 10 according to an embodiment of the present inventive concept.

Referring to FIG. 13, in the case that the voltage VCF (e.g., VDDM-VSSM) is lower than the lower limit voltage (e.g., VCF_L_Lim=VIN/2−ΔV), the P-type MOS transistor AP and the N-type MOS transistor N1 are turned on. Thus, a charge path (e.g., see a first loop LP1 of FIG. 13) is formed and charges are charged in the flying capacitor CF.

Referring to FIG. 14, in the case that the voltage VCF (e.g., VDDM-VSSM) is higher than the lower limit voltage (e.g., VCF_H_Lim=VIN/2−ΔV), the N-type MOS transistor AN and the N-type MOS transistor N1 are turned on. Thus, a discharge path (e.g., see a second loop LP2 of FIG. 14) is formed and charges in the flying capacitor CF are discharged.

Since the P-type and N-type MOS transistors AP and AN in the auxiliary switching circuit 131 operate according to the voltage VCF regardless of an amount of the output current $I_L$, even in the case that the output current $I_L$=0, the DC-DC converter 200 can control a difference between the voltage VCF and VIN/2 to be within a value of ΔV.

Figure 15:
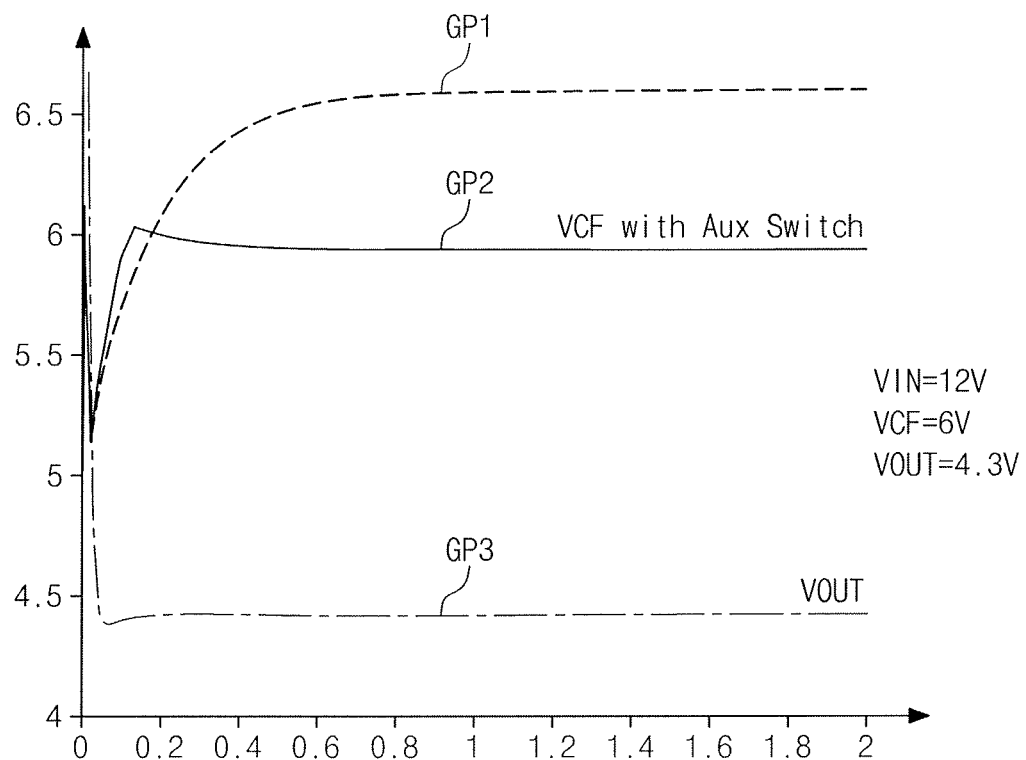
FIG. 15 is a waveform diagram of voltages at locations of the DC-DC converter of FIG. 10 according to an embodiment of the present inventive concept.

FIG. 15 is a waveform diagram of voltages at locations of the DC-DC converter 200 of FIG. 10 according to an embodiment of the present inventive concept.

Referring to FIG. 15, a horizontal axis represents a time of a millisecond unit and a vertical axis represents a voltage of a volt unit.

A graph GP1 represents a voltage VCF of the flying capacitor CF 120 when the auxiliary switching circuit 131 does not exist in the DC-DC converter 200 of FIG. 10. A graph GP2 represents a voltage VCF of the flying capacitor CF 120 when the auxiliary switching circuit 131 exists in the DC-DC converter 200 of FIG. 10. A graph GP3 shows an output voltage VOUT of the DC-DC converter 200 of FIG. 10.

Referring to FIG. 15, in the case of having the auxiliary switching circuit 131 (e.g., see the graph GP2), the voltage VCF has a level closer to a half level (e.g., 6 volt in FIG. 15) of the input voltage VIN than the voltage VCF corresponding to the graph GP1. For example, the voltage VCF of the graph GP2 is closer to the voltage VIN/2, which is a target voltage, than the voltage VCF of the graph GP1.

Figure 16:
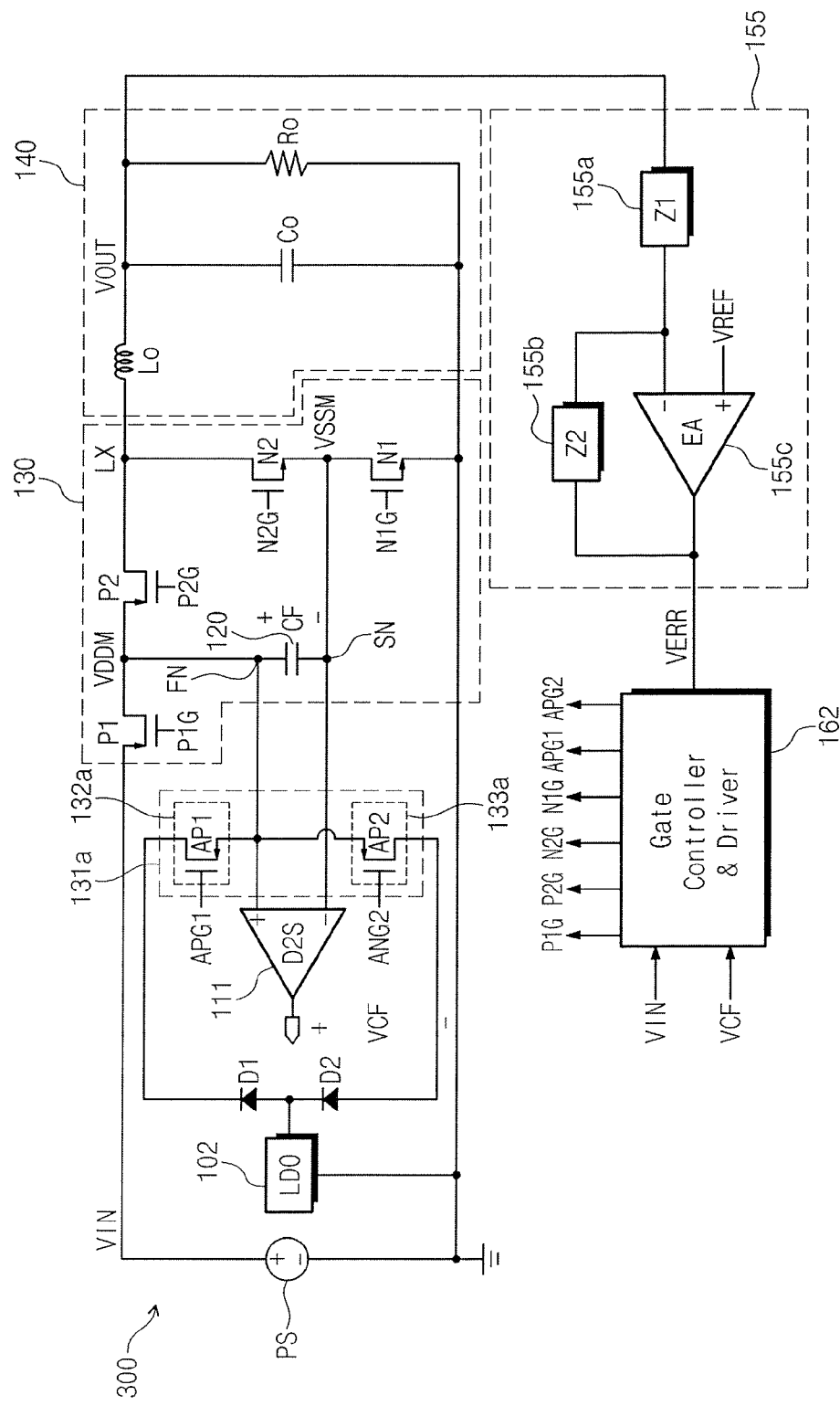
FIG. 16 is a circuit diagram illustrating a DC-DC converter according to an embodiment of the present inventive concept.

FIG. 16 is a circuit diagram illustrating a DC-DC converter 300 according to an embodiment of the present inventive concept.

Referring to FIG. 16, in addition to the DC-DC converter 200 of FIG. 10, the DC-DC converter 300 further includes first and second diodes D1 and D2, and a low drop out LDO 102.

In FIG. 16, a P-type MOS transistor AP2 133a of an auxiliary switching circuit 131a is included instead of the N-type MOS transistor AN of FIG. 10 due to a control structure. For example, the auxiliary switching circuit 131a may include a P-type MOS transistor AP1 132a and the P-type MOS transistor AP2 133a.

A charge target level and a discharge target level of a flying capacitor CF 120 in the DC-DC converter 300 of FIG. 16 may be set to an output voltage level of the low drop out LDO 102. Therefore, when charges in the flying capacitor CF are discharged, the voltage VCF is adjusted to be an output voltage level of the low drop out LDO 102.

Figure 17:
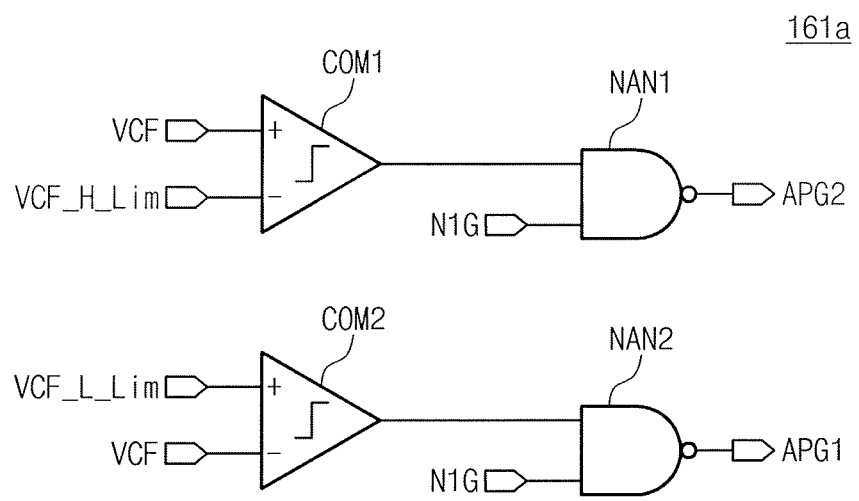
FIG. 17 is a circuit diagram illustrating a switching control unit for supplying auxiliary control signals to an auxiliary switching circuit of FIG. 16 according to an embodiment of the present inventive concept.

FIG. 17 is a circuit diagram illustrating a switching control unit 161a for supplying auxiliary control signals to an auxiliary switching circuit 131a of FIG. 16 according to an embodiment of the present inventive concept.

Referring to FIG. 17, the switching control unit 161a may include first and second comparators COM1 and COM2, and first and second NAND gates NAN1 and NAN2.

The voltage VCF sensed by the sensing circuit 111 of FIG. 16 is applied to each of a non-inverting stage (+) of the first comparator COM1 and an inverting stage (−) of the second comparator COM2.

An upper limit voltage level VCF_H_Lim and a lower limit voltage level VCF_L_Lim are applied to an inverting stage (−) of the first comparator COM1 and a non-inverting stage (+) of the second comparator COM2 respectively.

An output of the first comparator COM1 is provided to one input of the first NAND gate NAN1, and a switching control signal NIG is provided to the other input of the first NAND gate NAN1. The switching control signal NIG is a signal which is applied to a gate of the N-type MOS transistor N1.

An output of the second comparator COM2 is provided to one input of the second NAND gate NAN2, and a switching control signal NIG is provided to the other input of the second NAND gate NAN2.

Figure 18:
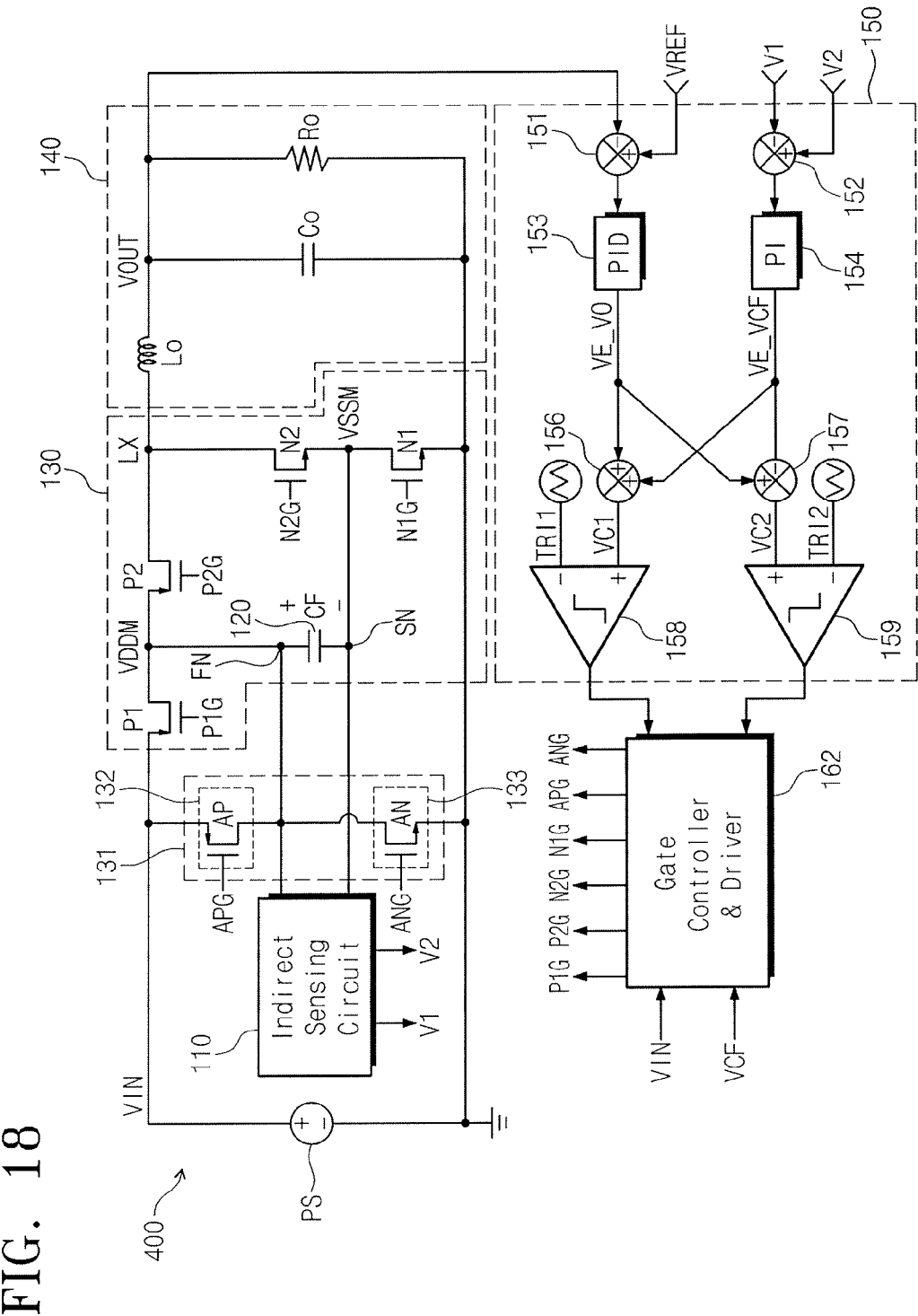
FIG. 18 is a circuit diagram illustrating a DC-DC converter according to an embodiment of the present inventive concept.

FIG. 18 is a circuit diagram illustrating a DC-DC converter 400 according to an embodiment of the present inventive concept.

Referring to FIG. 18, the DC-DC converter 400 may have substantially the same configuration as the DC-DC converter 200 of FIG. 10 except that the indirect sensing circuit 110 of FIG. 3 is included in the DC-DC converter 400 instead of the sensing circuit 111 of FIG. 10 and the feedback control unit 150 of FIG. 3 is included in the DC-DC converter 400 instead of the feedback control unit 155 of FIG. 10.

Referring to FIG. 18, the DC-DC converter 400 may have advantages provided by the circuit (e.g., the indirect sensing circuit 110) of FIG. 3 and advantages provided by the auxiliary switching circuit 131 in the DC-DC converter 400 such that a voltage VCF of the flying capacitor 120 may accurately be controlled regardless of how severely an input voltage VIN is changed or how much an inductor current amount Lo is provided.

For example, referring to FIG. 18, the indirect sensing circuit 110 generates the first and second sensing output voltages V1 and V2 such that a voltage corresponding to the sum of the voltage VSSM of the second node SN of the flying capacitor CF 120 and a fractional multiple (e.g., ½) of the input voltage VIN is equal to the voltage VDDM of the first node FN of the flying capacitor CF 120. The auxiliary switching circuit 131 is connected to the first node FN to charge or discharge the flying capacitor CF 120 in response to an auxiliary switching control signal (e.g., APG or ANG).

Thus, without using an active circuit or increasing the number of circuits, the DC-DC converter 400 according to an embodiment of the present inventive concept may accurately a voltage VCF between the first and second nodes FN and SN of the flying capacitor CF 120 and may accurately control the voltage VCF of the flying capacitor CF 120 regardless of how severely an input voltage is changed or how much an inductor current Lo flows.

Figure 19:
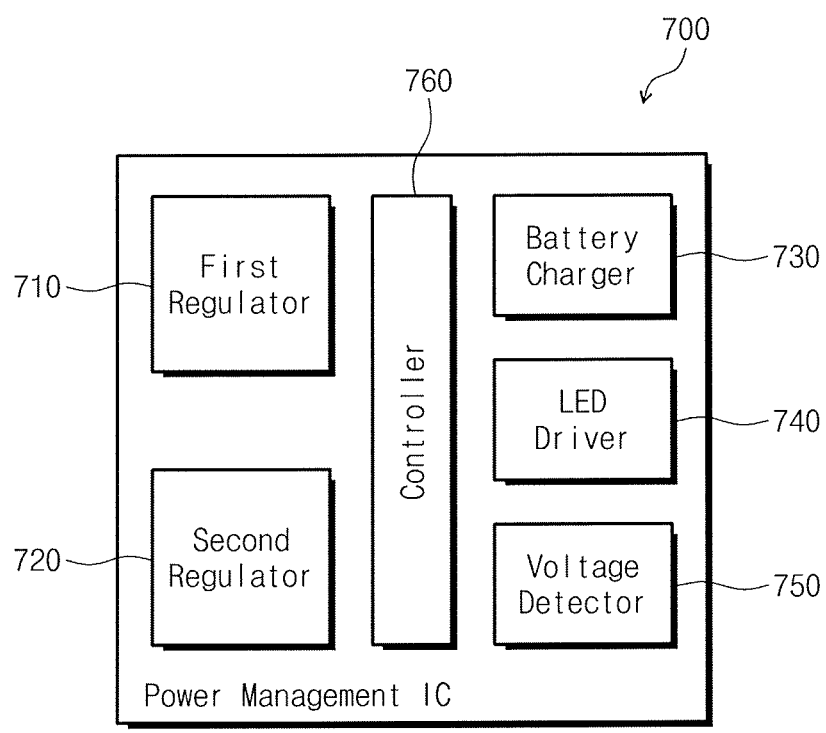
FIG. 19 is a block diagram illustrating a power management integrated circuit according to an embodiment of the present inventive concept.

FIG. 19 is a block diagram illustrating a power management integrated circuit (IC) 700 including a DC-DC converter (e.g., 100, 200, 300, or 400) according to an embodiment of the present inventive concept.

Referring to FIG. 19, the power management IC 700 is an integrated circuit for a power management. The power management IC 700 may be used in an electronic device such as a mobile phone or a portable multimedia player (PMP).

The power management IC 700 includes at least one voltage regulator (e.g., 710 or 720 of FIG. 19). The voltage regulator 710 or 720 supplies power to constituent elements of the electronic device. For example, the voltage regulator 710 or 720 may be the DC-DC converter (e.g., 100, 200, 300, or 400) according to an embodiment of the present inventive concept or may include the DC-DC converter (e.g., 100, 200, 300, or 400) according to an embodiment of the present inventive concept. The voltage regulator 710 or 720, or another internal converter may include the sensing circuit 110 of FIG. 3 or the auxiliary switching circuit 131 of FIG. 10.

Without using an active circuit or increasing the number of circuits, the voltage regulator 710 or 720 (e.g., 100, 200, 300, or 400) according to an embodiment of the present inventive concept may accurately sense a voltage VCF between both nodes of a flying capacitor therein and may control the voltage of the flying capacitor regardless of how severely an input voltage is changed or how much an inductor current amount flows, and thus, performance of the power management IC 700 is increased.

The power management IC 700 may include various constituent elements. For example, the power management IC 700 may further include a battery charger 730, a light-emitting diode (LED) driver 740, a voltage detector 750, and a controller 760.

The battery charger 730 can charge a battery based on the control of the controller 760. The LED driver 740 can drive an LED of the electronic device based on the control of the controller 760. The voltage detector 750 can detect a voltage of the electronic device based on the control of the controller 760. The controller 760 can control an operation of the voltage regulator 710 or 720, or another internal converter.

Figure 20:
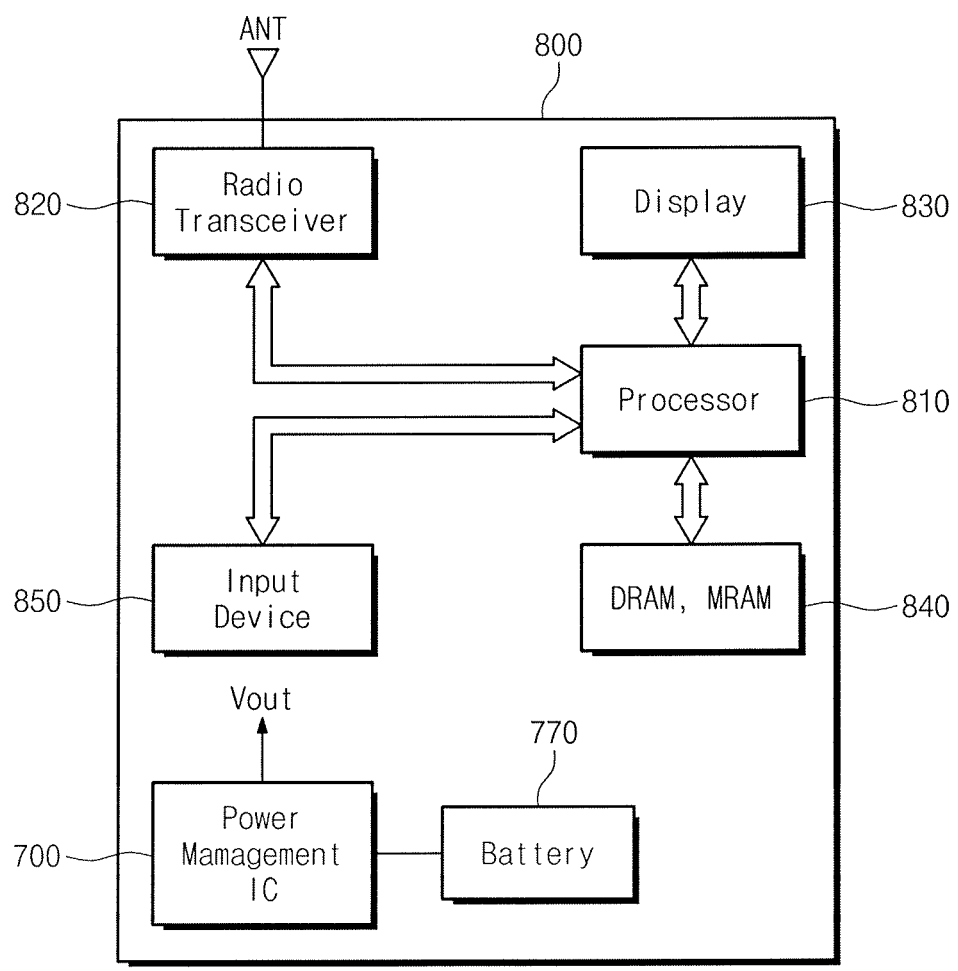
FIG. 20 is a block diagram illustrating a smart phone according to an embodiment of the present inventive concept.

FIG. 20 is a block diagram illustrating a smart phone 800 according to an embodiment of the present inventive concept.

Referring to FIG. 20, the smart phone 800 may include the power management IC 700 of FIG. 19, a battery 770, a processor 810, a radio transceiver 820, a display 830, a memory 840, and an input device 850.

The power management IC 700 is supplied with power from the battery 770, and the power management IC 700 performs power management on the processor 810, the radio transceiver (e.g., wireless transceiver) 820, the display 830, the memory 840, and the input device 850. Thus, the first or second regulator 710 or 720 (e.g., DC-DC converter according to an embodiment of the present inventive concept) in the power management IC 700 can accurately sense a voltage between both nodes of a flying capacitor without using an active circuit or increasing the number of circuits.

Since the DC-DC converter (e.g., 100, 200, 300, or 400) according to an embodiment of the present inventive concept) provides a stable power output in a smart phone of a capacitor-less type, the DC-DC converter may easily be implemented into a system on chip, a manufacturing cost may be reduced, and a manufacturing defect rate may be reduced.

The wireless transceiver 820 can transmit or receive a wireless signal through an antenna ANT. The wireless transceiver 820 can convert a wireless signal received through the antenna ANT into a signal that can be processed by the processor 810. Thus, the processor 810 can process a signal output from the wireless transceiver 820, and can store the processed signal in the memory 840 or can display the processed signal through the display 830.

The wireless transceiver 820 can convert a signal output from the processor 810 into a wireless signal, and can output the converted wireless signal to the outside through the antenna ANT.

The input device 850 can receive a control signal for controlling an operation of the processor 810 or data to be processed by the processor 810. The input device 850 can be embodied by a key pad, a keyboard or a pointing device such as a touch pad, a computer mouse, or the like.

The processor 810 can control the display 830 so that data output from the memory 840, a wireless signal output from the wireless transceiver 820, or data output from the input device 850 is displayed through the display 830.

Figure 21:
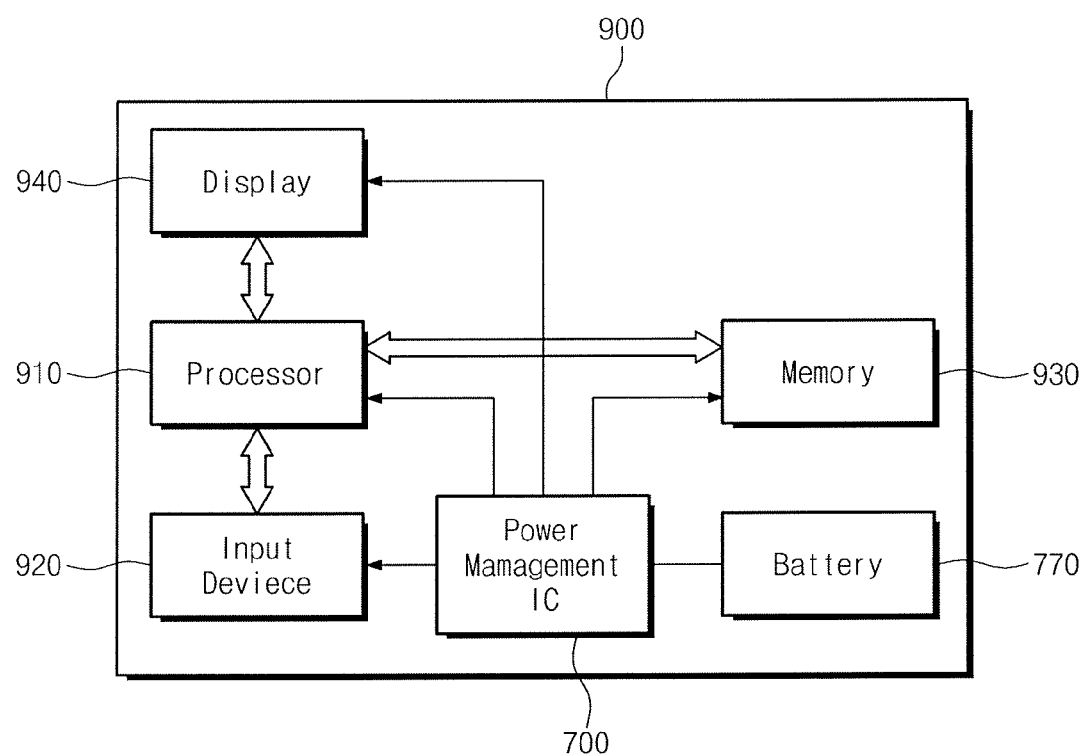
FIG. 21 is a block diagram illustrating an electronic device according to an embodiment of the present inventive concept.

FIG. 21 is a block diagram illustrating an electronic device according to an embodiment of the present inventive concept.

Referring to FIG. 21, the electronic device 900 can be embodied by a data processing device such as a personal computer (PC), a tablet computer, a net-book, an e-reader, a personal digital assistant (PDA), a portable multimedia player (PMP), an MP3 player, an MP4 player, or the like. The electronic device 900 may include the power management IC 700, the battery 770, an input device 920, a memory 930, and a display 940.

The power management IC 700 is supplied with power from the battery 770. The power management IC 700 can perform power management on the input device 920, the memory 930, and the display 940. Thus, the power management IC 700 includes the DC-DC converter (e.g., 100, 200, 300, or 400) in accordance with an embodiment of the present inventive concept, and thus, reliability in power management of the electronic device may increase.

The electronic device 900 may include a processor 910 for controlling an operation of the electronic device 900. The processor 910 can display data stored in the memory 930 through the display 940 according to an input signal generated by the input device 920. The input device 920 can be embodied by a key pad, a keyboard or a pointing device such as a touch pad, a computer mouse, or the like.

Figure 22:
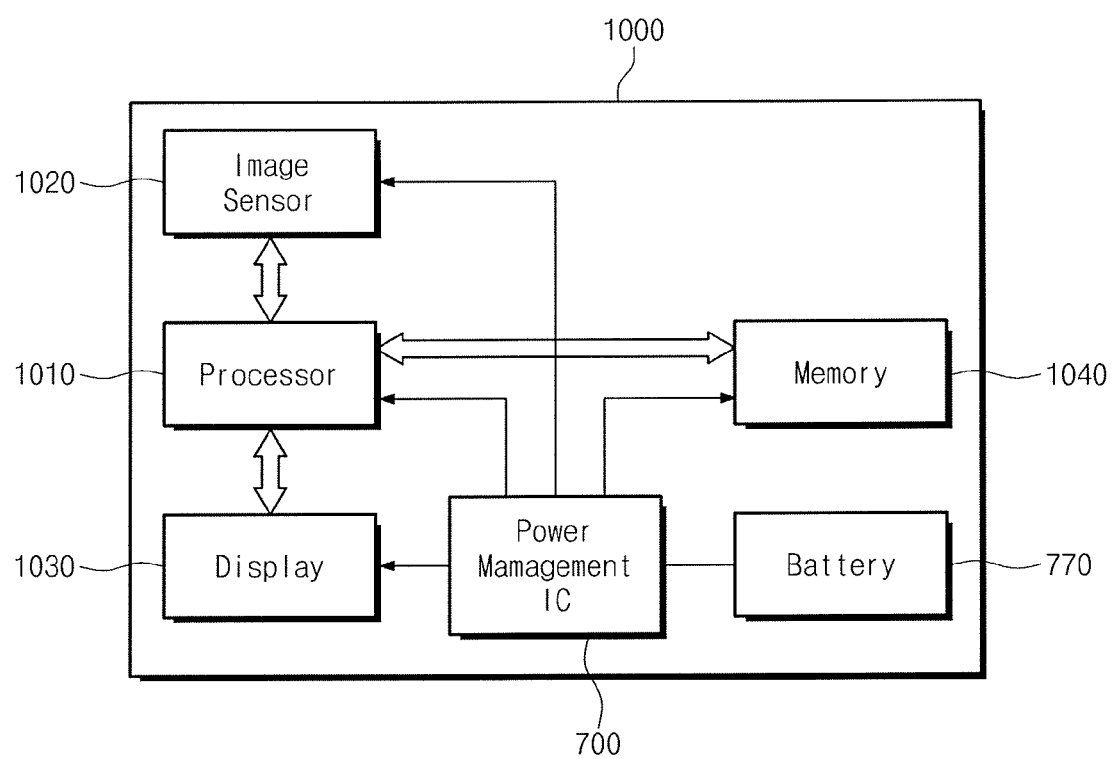
FIG. 22 is a block diagram illustrating an electronic device according to an embodiment of the present inventive concept.

FIG. 22 is a block diagram illustrating an electronic device according to an embodiment of the present inventive concept.

Referring to FIG. 22, an electronic device 1000 can be embodied by a digital camera. The electronic device 1000 includes the power management IC 700 and the battery 770, a processor 1010, an image sensor 1020, a display 1030, and a memory 1040.

The power management IC 700 is supplied with power from the battery 770. The power management IC 700 can perform power management on the processor 1100, the image sensor 1200, the memory 1300, and the display 1400. Thus, the power management IC 700 can minimize or reduce a negative peak or a positive peak of a power output in a short time, which occurs according to a load change of a digital camera, through a feedback control of the DC-DC converter in the power management IC 700 in accordance with an embodiment of the present inventive concept. Even when the digital camera is a capacitor-less type, a stabilized power output having a rapid response may be provided.

The image sensor 1020 of the electronic device 1000 converts an optical signal into a digital signal, and the converted digital signal may be stored in the memory 1040 or may be displayed through the display 1030 based on a control of the processor 1010. The digital signal stored in the memory 1040 can be displayed through the display 1030 based on a control of the processor 1010.

Figure 23:
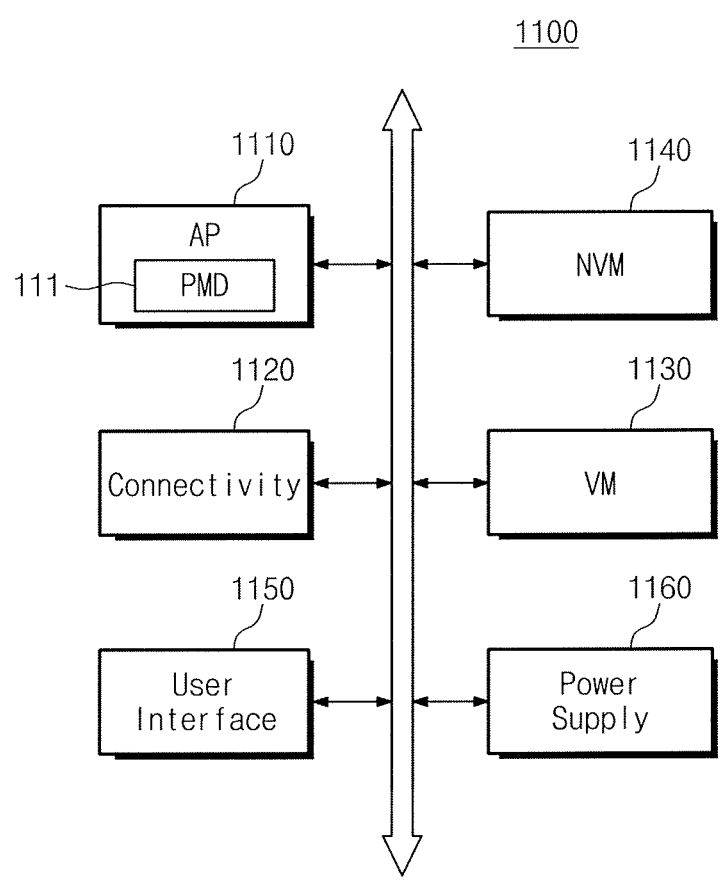
FIG. 23 is a block diagram illustrating a mobile system according to an embodiment of the present inventive concept.

FIG. 23 is a block diagram illustrating a mobile system according to an embodiment of the present inventive concept.

Referring to FIG. 23, the mobile system 1100 may include an application processor 1110, a connectivity unit 1120, a volatile memory 1130, a nonvolatile memory 1140, a user interface 1150, and a power supply 1160. The mobile system 1100 may be an arbitrary mobile system such as a mobile phone, a personal digital assistant (PDA), a portable multimedia player (PMP), a digital camera, a music player, a portable game console, a navigation system, etc.

The application processor 1110 can execute applications providing an internet browser, a game, a video, etc. The application processor 1110 includes a power management device 1111. The power management device 1111 may include the DC-DC converter (e.g., 100, 200, 300, or 400) in accordance with an embodiment of the present inventive concept. Thus, the power management device 1111 can minimize or reduce an undershoot or an overshoot of a power output, which occurs according to a load change of the mobile system, through the DC-DC converter in the power management device in accordance with an embodiment of the present inventive concept. Even when the mobile system has a system on chip of a capacitor-less type, a stabilized power output having a rapid response may be provided.

The application processor 1110 may be connected to a cache memory located inside or outside the application processor 1110.

The connectivity unit 1120 can perform a communication with an external device. For example, the connectivity unit 1120 can perform a universal serial bus (USB) communication, an Ethernet communication, a near field communication (NFC), a radio frequency identification (RFID) communication, a mobile telecommunication, a memory card communication, etc.

The nonvolatile memory 1140 can store a booting code for booting the mobile system 1100. For example, the nonvolatile memory 1140 may be embodied by an electrically erasable programmable read-only memory (EEPROM), a flash memory, a phase change random access memory (PRAM), a resistive random access memory (RRAM), a nanotube floating gate memory (NFGM), a polymer random access memory (PoRAM), a magnetic random access memory (MRAM), a spin-transfer torque MRAM, a conductive bridging random access memory (CBRAM), a ferroelectric random access memory (FeRAM), a holographic memory, a molecular electronics memory device, an insulator resistance change memory, etc, or a memory similar thereto.

The user interface 1150 may include at least one input device such as a keypad, a touch screen, or the like, and/or at least one output device such as a speaker, a display device, or the like.

The power supply 1160 can supply an operating voltage to the mobile system 1100. The mobile system 1100 may further include a modem such as a camera image processor and a baseband chip set. For example, the modem may be a modem processor supporting a communication such as global system for mobile communications (GSM), general packet radio service (GPRS), wide code division multiple access WCDMA, HSxPA (e.g., high-speed downlink packet access (HSDPA) and high-speed uplink packet access (HSUPA), etc.

According to the configuration of the DC-DC converter (e.g., 100, 200, 300, or 400) in accordance with an embodiment of the present inventive concept, a voltage between two nodes of a flying capacitor is accurately sensed without using an active circuit or increasing the number of circuits.

According to the configuration of the DC-DC converter (e.g., 100, 200, 300, or 400) in accordance with an embodiment of the present inventive concept, a voltage of a flying capacitor is accurately controlled regardless of how severely an input voltage is changed or how much an inductor current flows.

Although the present inventive concept has been described with reference to exemplary embodiments thereof, it will be understood that various changes in forms and detail may be made therein without departing from the scope and spirit of the present inventive concept.

What is claimed is:

1. A voltage converter comprising:
a power switching unit comprising a plurality of power switches and a capacitor; and
an indirect sensing circuit receiving an input voltage, a first voltage at a first node of the capacitor, and a second voltage at a second node of the capacitor and generating first and second sensing output voltages based on the input voltage and the first and second voltages, wherein a voltage difference between the first and second voltages is equal to a fractional multiple of the input voltage.

2. The voltage converter of claim 1, wherein the indirect sensing circuit includes passive devices and does not include an active device.

3. The voltage converter of claim 1, wherein the indirect sensing circuit includes a resistor network having a plurality of resistors.

4. The voltage converter of claim 1, wherein the fractional multiple of the input voltage is half of the input voltage.

5. The voltage converter of claim 4, wherein the first sensing output voltage corresponds to 1/N (N is a real number greater than 1) times the first voltage, and the second sensing output voltage corresponds to a sum of a voltage of 1/N times the second voltage and a voltage of 1/(2N) times the input voltage.

6. The voltage converter of claim 5, wherein the indirect sensing circuit includes first and second resistors connected between the first node and a ground node,
wherein the voltage of 1/N times the first voltage is generated by dividing the first voltage using the first and second resistors.

7. The voltage converter of claim 5, wherein the sum of a voltage of 1/N times the second voltage and the voltage of 1/(2N) times the input voltage is generated based on the input voltage and a resistor network connected to the second node and a ground node.

8. The voltage converter of claim 1, wherein the power switching unit is configured to generate a voltage output having three levels.

9. The voltage converter of claim 1, wherein the power switching unit includes four metal-oxide-semiconductor (MOS) transistors.

10. The voltage converter of claim 9, wherein the first and second sensing output voltages are used in a feedback control to switch the four MOS transistors.

11. A voltage converter comprising:
a power switching unit comprising a plurality of power switches and a capacitor;
a sensing circuit sensing a voltage between first and second nodes of the capacitor to control the voltage between the first and second nodes to be a fractional multiple of an input voltage; and
an auxiliary switching circuit configured to be connected to the first node and configured to charge or discharge the capacitor in response to an auxiliary switching control signal.

12. The voltage converter of claim 11, wherein the fractional multiple of an input voltage is half of the input voltage.

13. The voltage converter of claim 11, wherein the sensing circuit includes a non-inverting input node and an inverting input node,
wherein the non-inverting input node is connected to the first node, and the inverting input node is connected to the second node, and
wherein the sensing circuit outputs a voltage corresponding to the voltage between the first and second nodes.

14. The voltage converter of claim 11, wherein the auxiliary switching circuit comprises:
a first metal-oxide-semiconductor (MOS) transistor including a source terminal to which the input voltage is applied and a drain terminal connected to the first node; and
a second MOS transistor including a source terminal connected to the first node and a drain terminal connected to a ground.

15. The voltage converter of claim 14, wherein the first MOS transistor is configured to charge the capacitor when the voltage between the first and second nodes of the capacitor is lower than a first voltage level, and
wherein the second MOS transistor is configured to discharge the capacitor when the voltage between the first and second nodes of the capacitor is higher than a second voltage level greater than the first voltage level.

16. A voltage converter comprising:
a power switching unit comprising a plurality of power switches and a capacitor;
an indirect sensing circuit including a resistor network, two input nodes of the resistor network are respectively connected to first and second nodes of the capacitor, and outputting first and second sensing output voltages through two output nodes of the resistor network, respectively; and
an auxiliary switching circuit charging or discharging the capacitor in response to an auxiliary switching control signal,
wherein the first sensing output voltage corresponds to a voltage at the first node, and the second sensing output voltage corresponds to a sum of a voltage at the second node and half of an input voltage applied through one end of a first switching circuit of the auxiliary switching circuit.

17. The voltage converter of claim 16, wherein the auxiliary switching circuit includes the first switching circuit and a second switching circuit, and
wherein another end of the first switching circuit and one end of the second switching circuit are commonly connected to the first node of the capacitor.

18. The voltage converter of claim 17, wherein another end of the second switching circuit is connected to a ground node.

19. The voltage converter of claim 17, wherein each of the first and second switching circuits is a transistor.

20. The voltage converter of claim 16, wherein the indirect sensing circuit does not include an active device.

\* \* \* \* \*